US011164455B2

(12) United States Patent
Oba

(10) Patent No.: US 11,164,455 B2
(45) Date of Patent: Nov. 2, 2021

(54) VEHICLE CONTROL DEVICE, VEHICLE CONTROL METHOD, INFORMATION PROCESSING APPARATUS, AND TRAFFIC INFORMATION SUPPLYING SYSTEM

(71) Applicant: SONY CORPORATION, Tokyo (JP)

(72) Inventor: Eiji Oba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 364 days.

(21) Appl. No.: 15/569,156

(22) PCT Filed: Jul. 22, 2016

(86) PCT No.: PCT/JP2016/003431
§ 371 (c)(1),
(2) Date: Oct. 25, 2017

(87) PCT Pub. No.: WO2017/029775
PCT Pub. Date: Feb. 23, 2017

(65) Prior Publication Data
US 2018/0151066 A1    May 31, 2018

(30) Foreign Application Priority Data

Aug. 19, 2015 (JP) .............................. JP2015-162030

(51) Int. Cl.
*G08G 1/0967* (2006.01)
*G08G 1/16* (2006.01)
*G01C 21/34* (2006.01)
*G05D 1/00* (2006.01)
*G05D 1/02* (2020.01)

(52) U.S. Cl.
CPC ... *G08G 1/096725* (2013.01); *G01C 21/3407* (2013.01); *G05D 1/0088* (2013.01); *G05D 1/0223* (2013.01); *G05D 1/0285* (2013.01); *G08G 1/096741* (2013.01); *G08G 1/096791* (2013.01); *G08G 1/163* (2013.01)

(58) Field of Classification Search
CPC .............................................. G08G 1/096725
See application file for complete search history.

(56) References Cited

U.S. PATENT DOCUMENTS

2013/0211656 A1* 8/2013 An ....................... G05D 1/0285
701/25
2014/0063232 A1* 3/2014 Fairfield ................... B60T 7/18
348/118
2014/0070960 A1 3/2014 Sung et al.
(Continued)

FOREIGN PATENT DOCUMENTS

JP    2010-128959 A    6/2010
MX   2015001898 A    8/2015

OTHER PUBLICATIONS

International Search Report dated Nov. 15, 2016 in corresponding PCT/JP2016/003431, 3 pages.
(Continued)

*Primary Examiner* — Imran K Mustafa

(57) ABSTRACT

A system for an autonomous vehicle that receives driving environment information corresponding to a driving environment provided by another autonomous vehicle, and determines a navigation route based on a degree of reliability of the driving environment information provided by the another autonomous vehicle.

15 Claims, 17 Drawing Sheets

(56) References Cited

U.S. PATENT DOCUMENTS

| | | | |
|---|---|---|---|
| 2015/0134180 A1* | 5/2015 | An | G08G 1/005 |
| | | | 701/23 |
| 2015/0178998 A1* | 6/2015 | Attard | G07C 5/008 |
| | | | 701/23 |
| 2015/0235557 A1* | 8/2015 | Engelman | G08G 1/096725 |
| | | | 701/24 |

OTHER PUBLICATIONS

Japanese Office Action dated Feb. 18, 2020 in Japanese Application No. 2015-162030.

* cited by examiner

[Fig. 1]
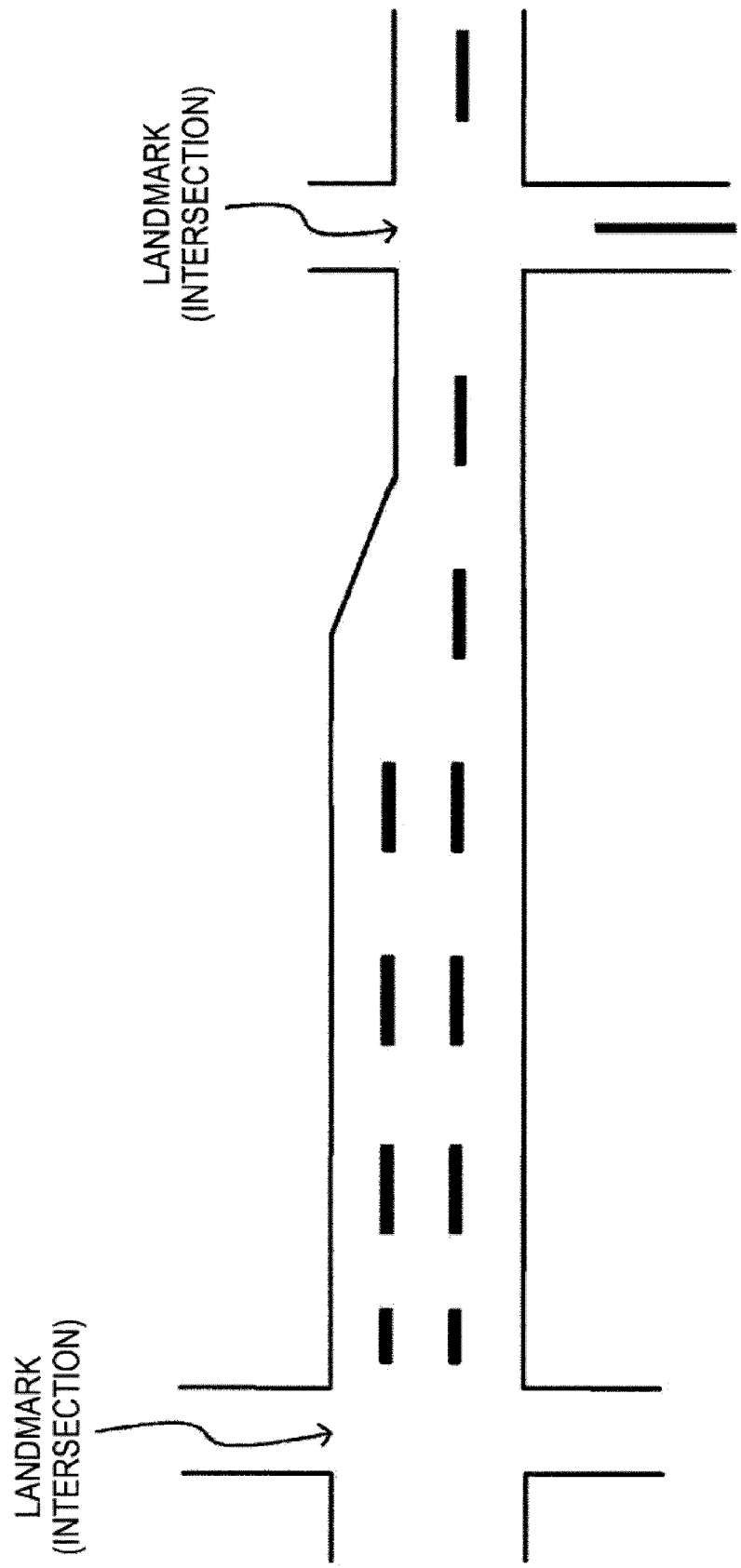

[Fig. 2]
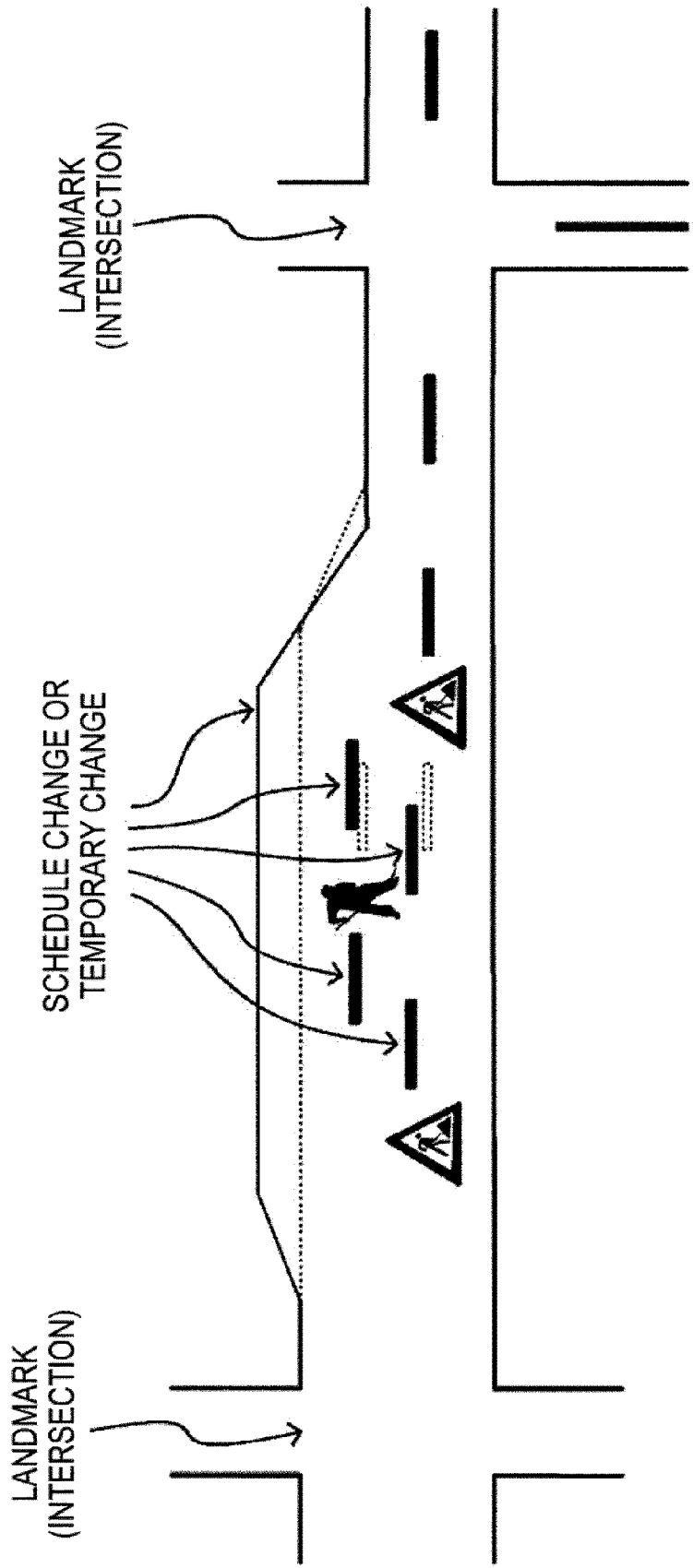

[Fig. 3]
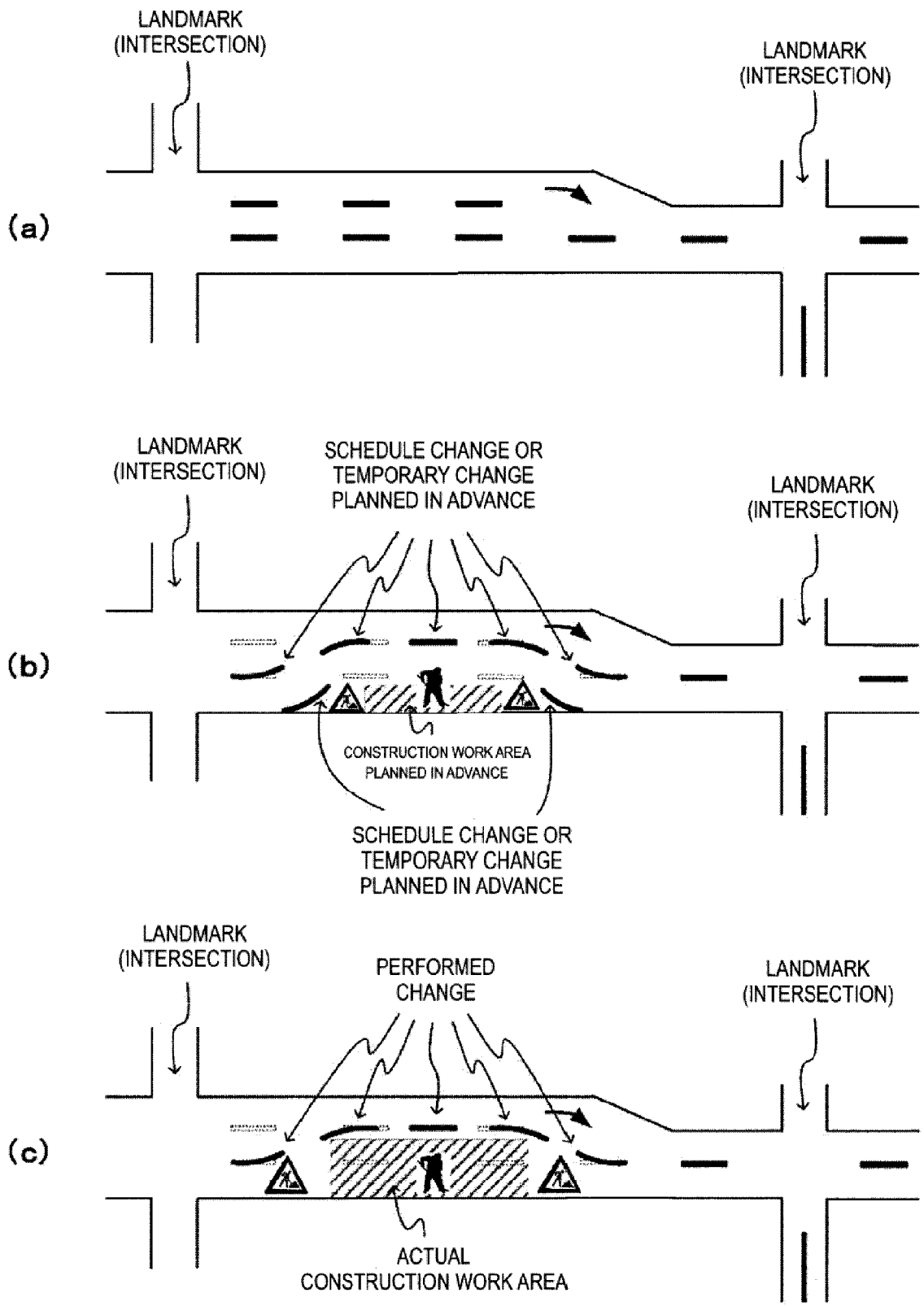

[Fig. 4]
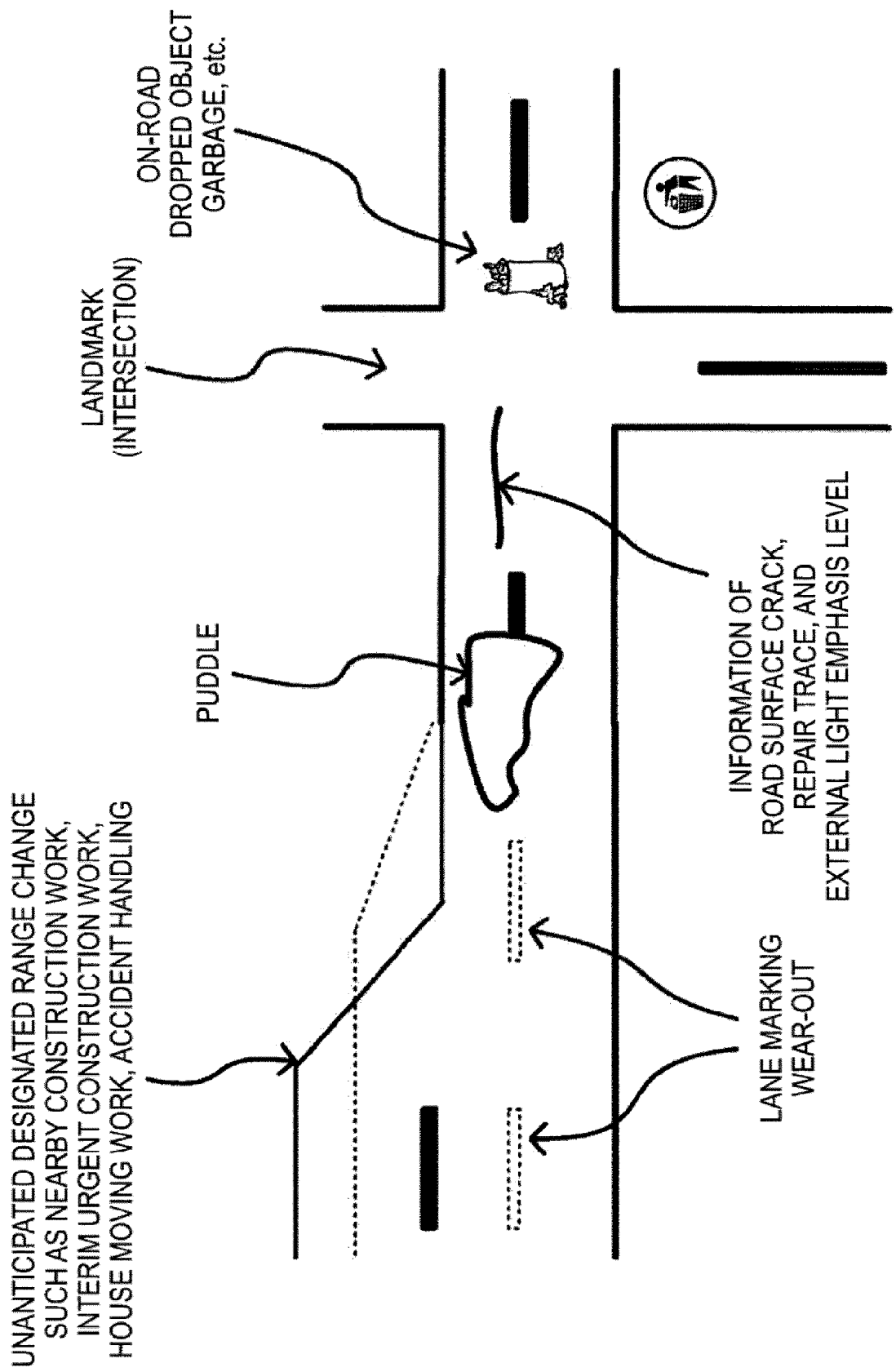

[Fig. 5]
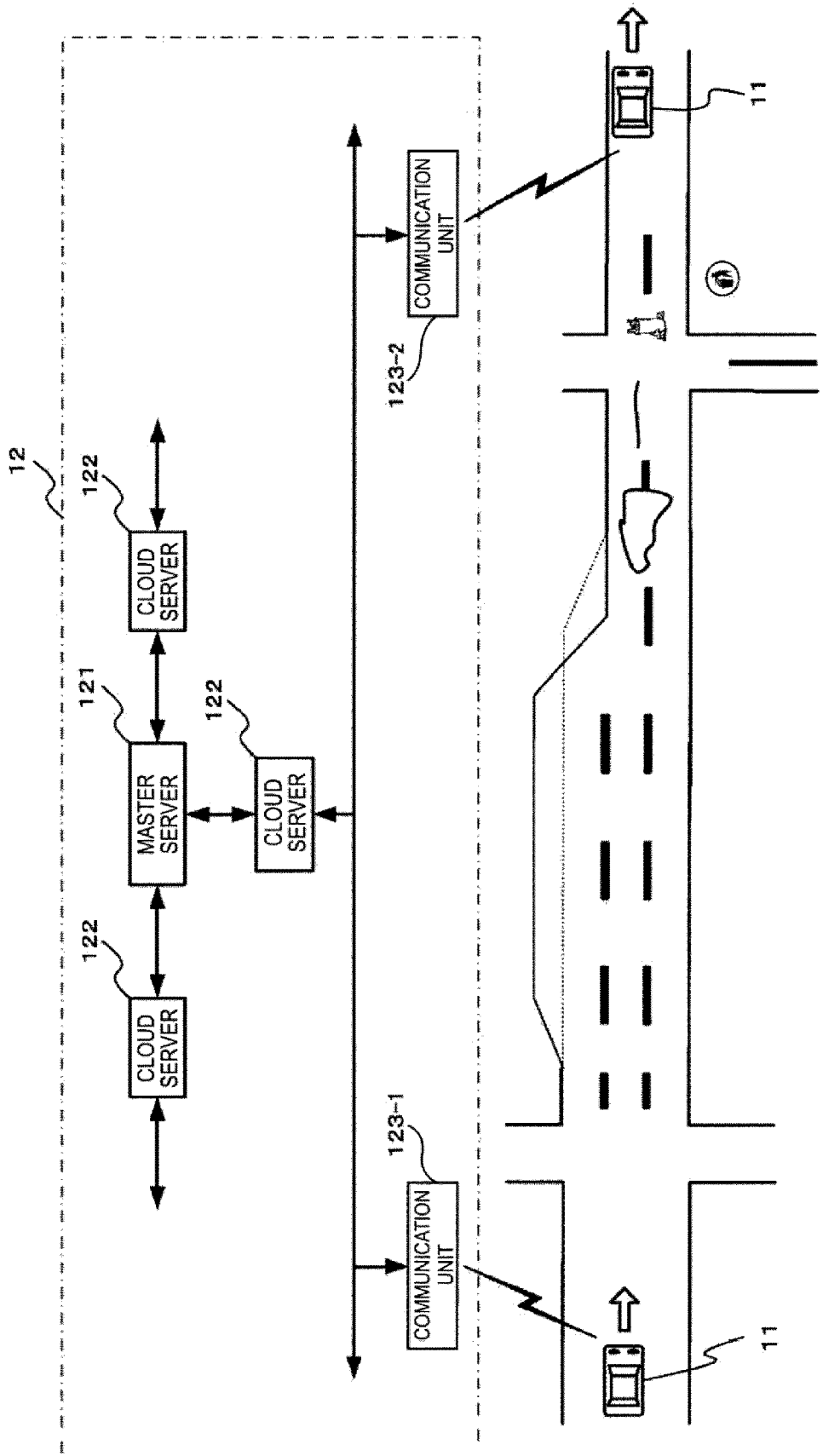

[Fig. 6]
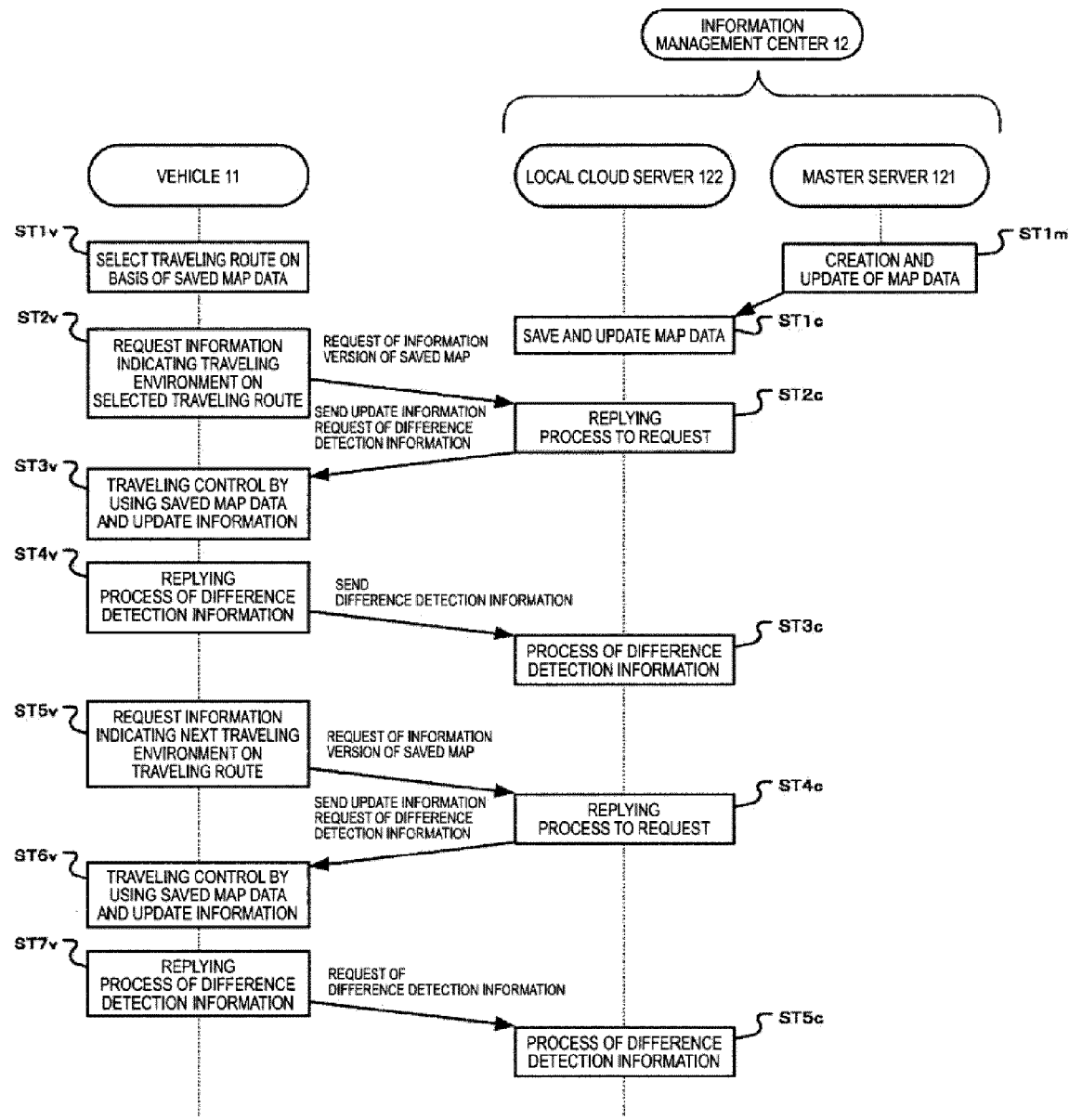

[Fig. 7]
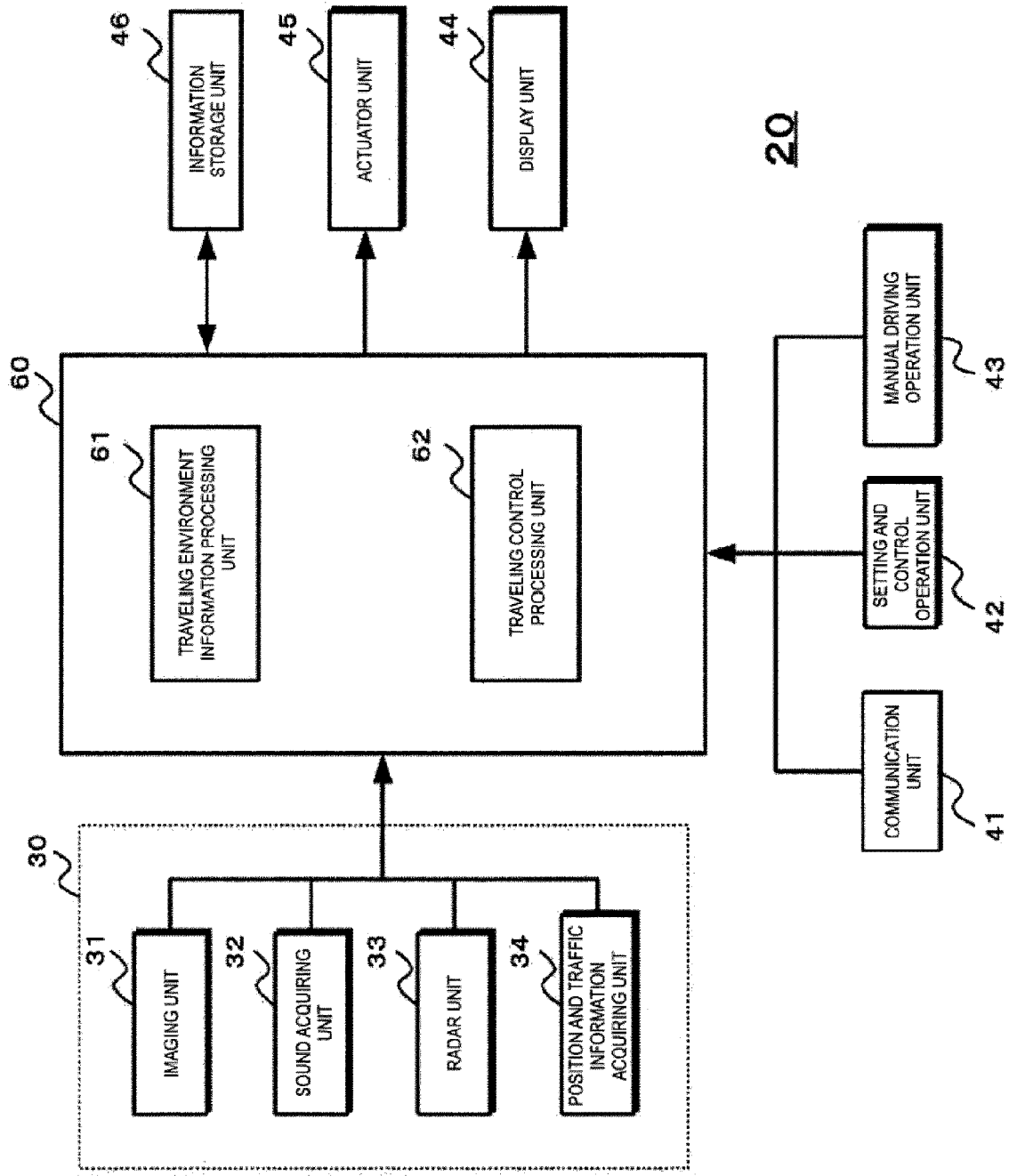

[Fig. 8]
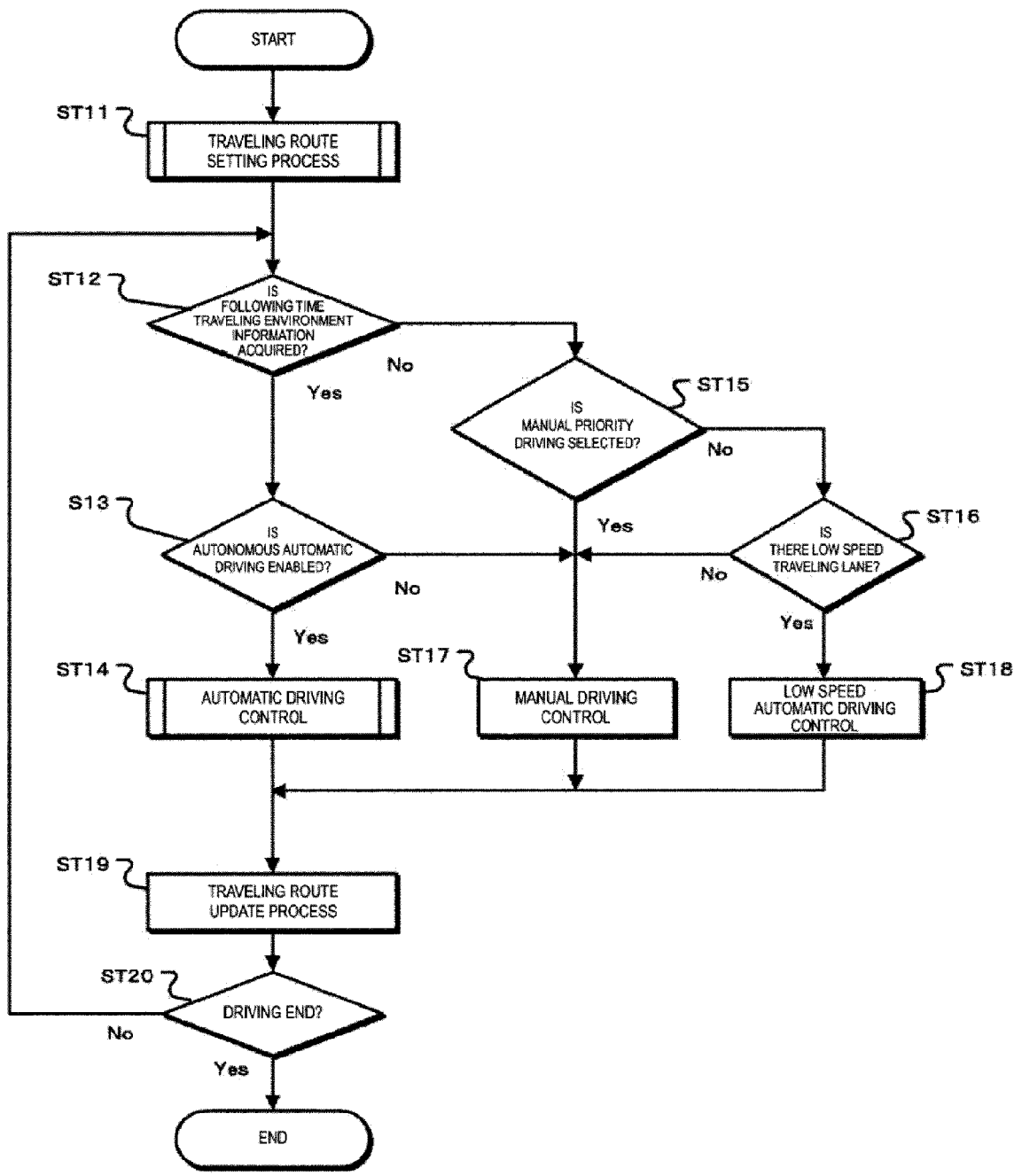

[Fig. 9]
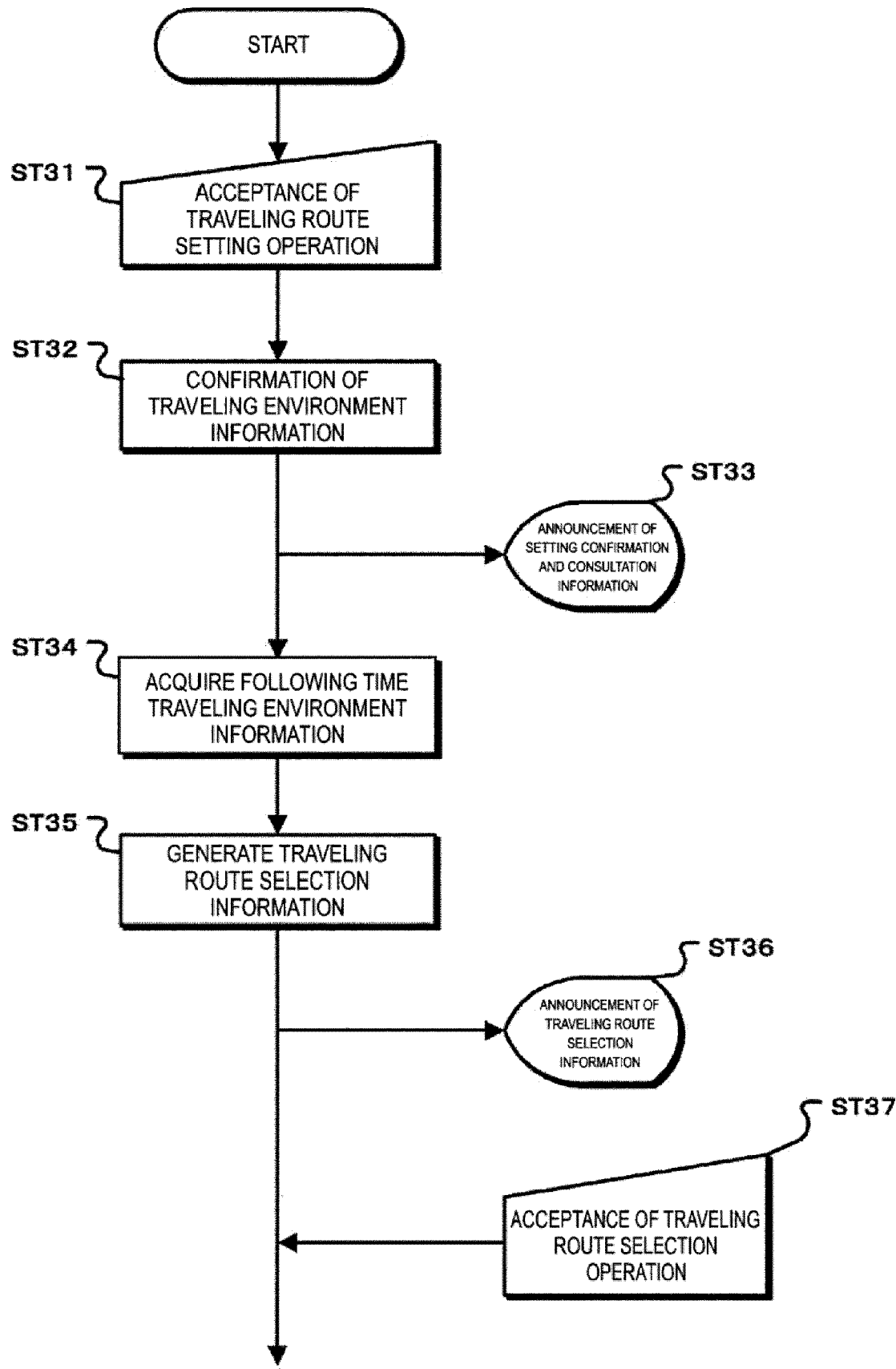

[Fig. 10]
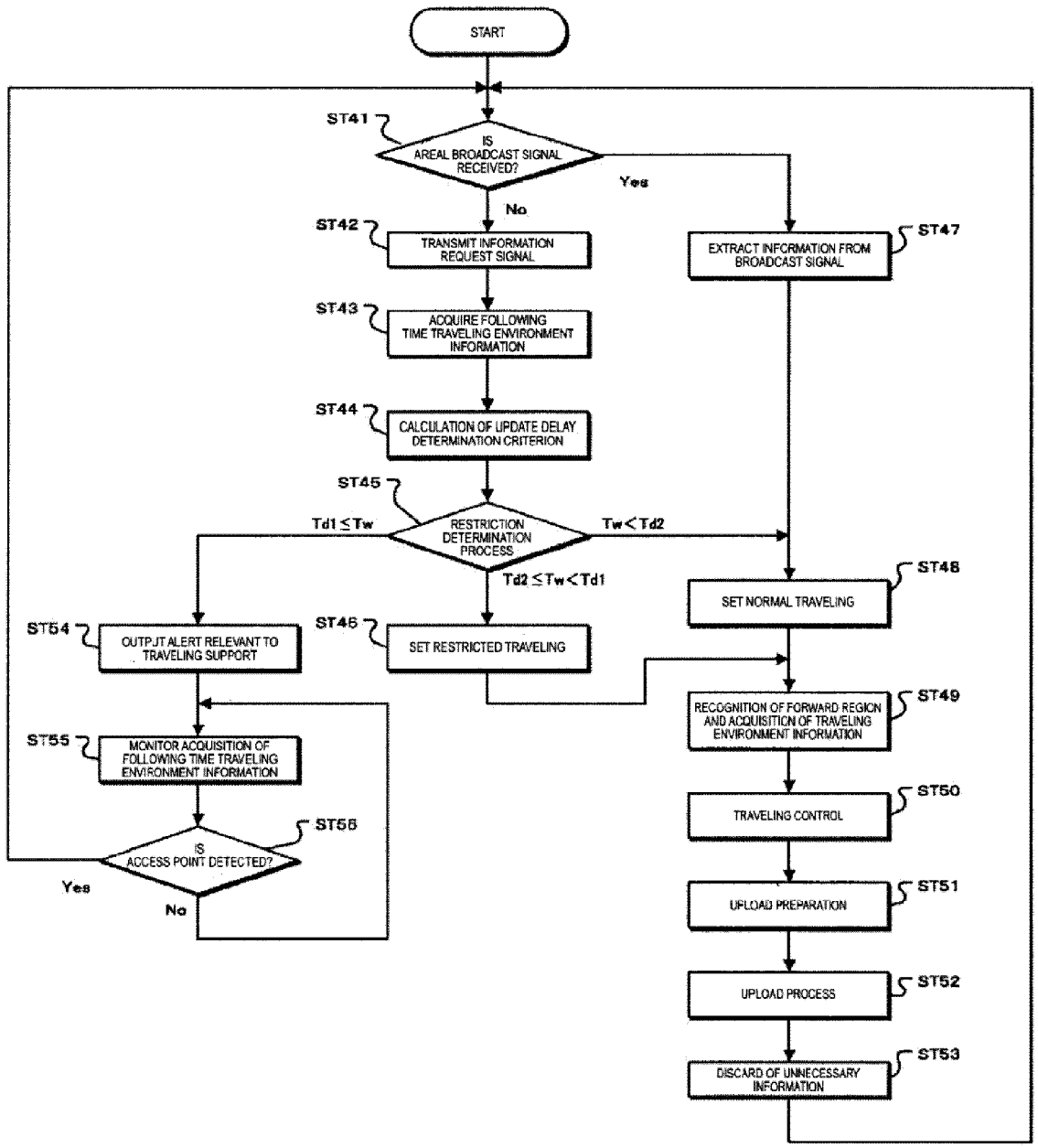

[Fig. 11]
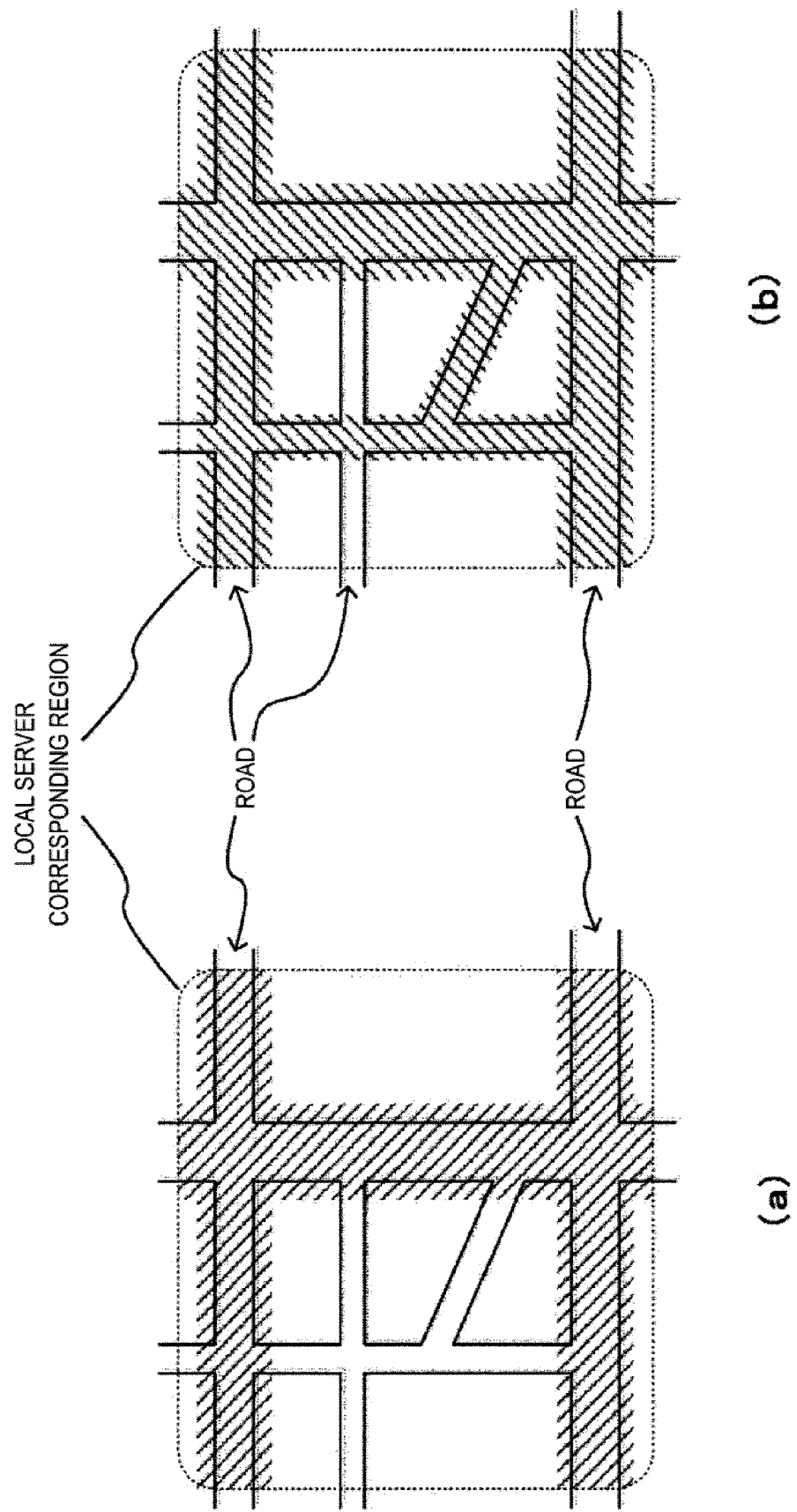

[Fig. 12]
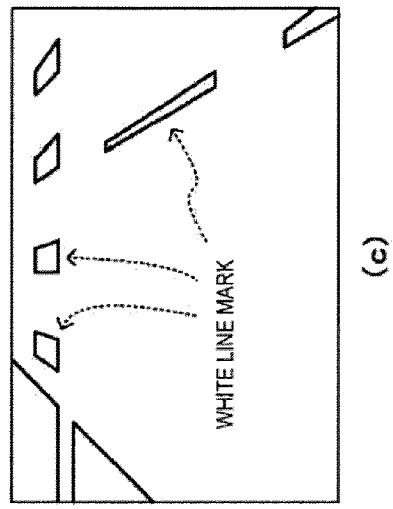
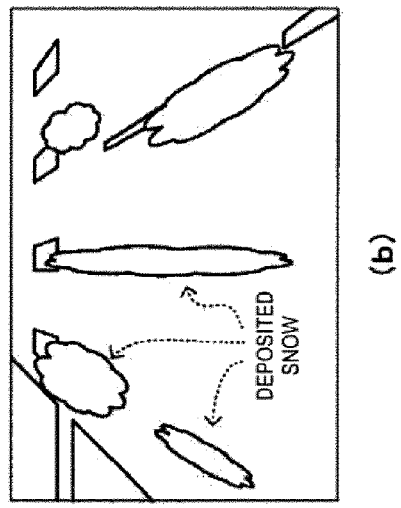
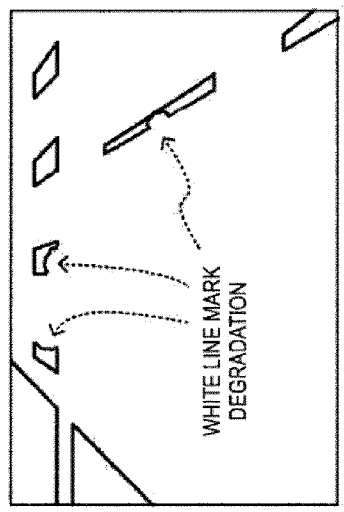

[Fig. 13]
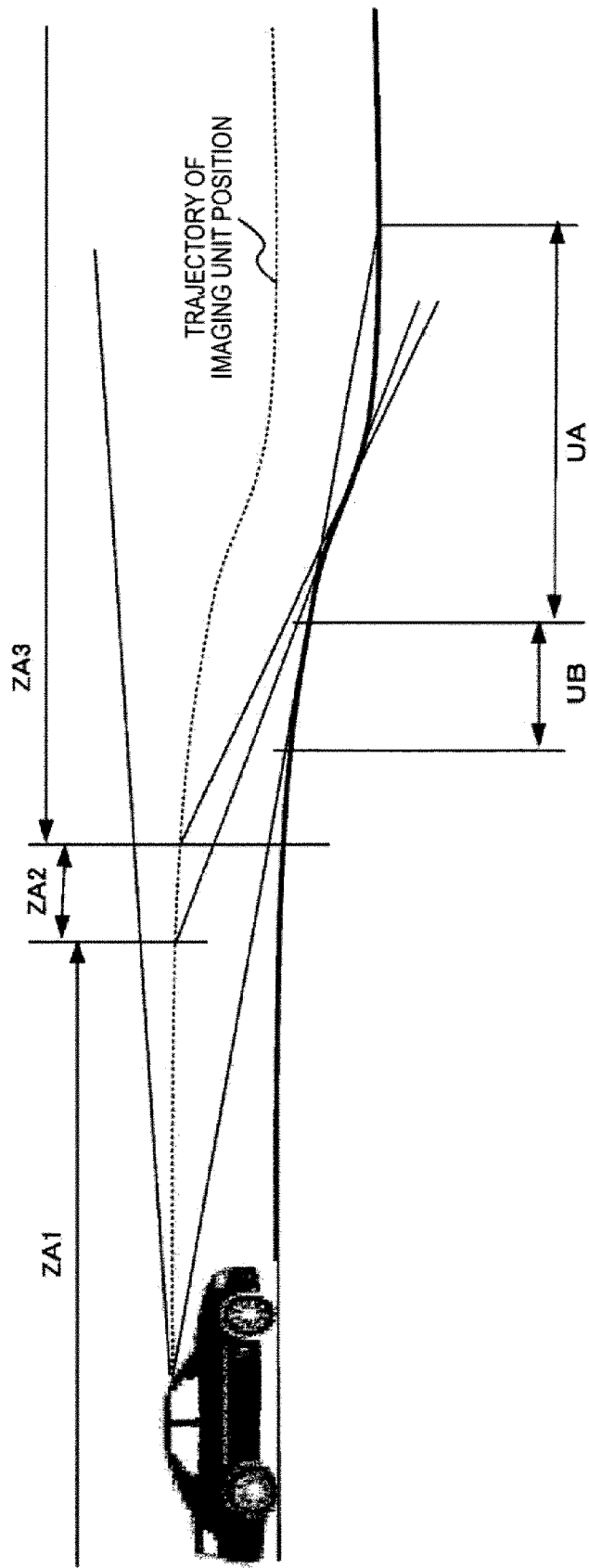

[Fig. 14]
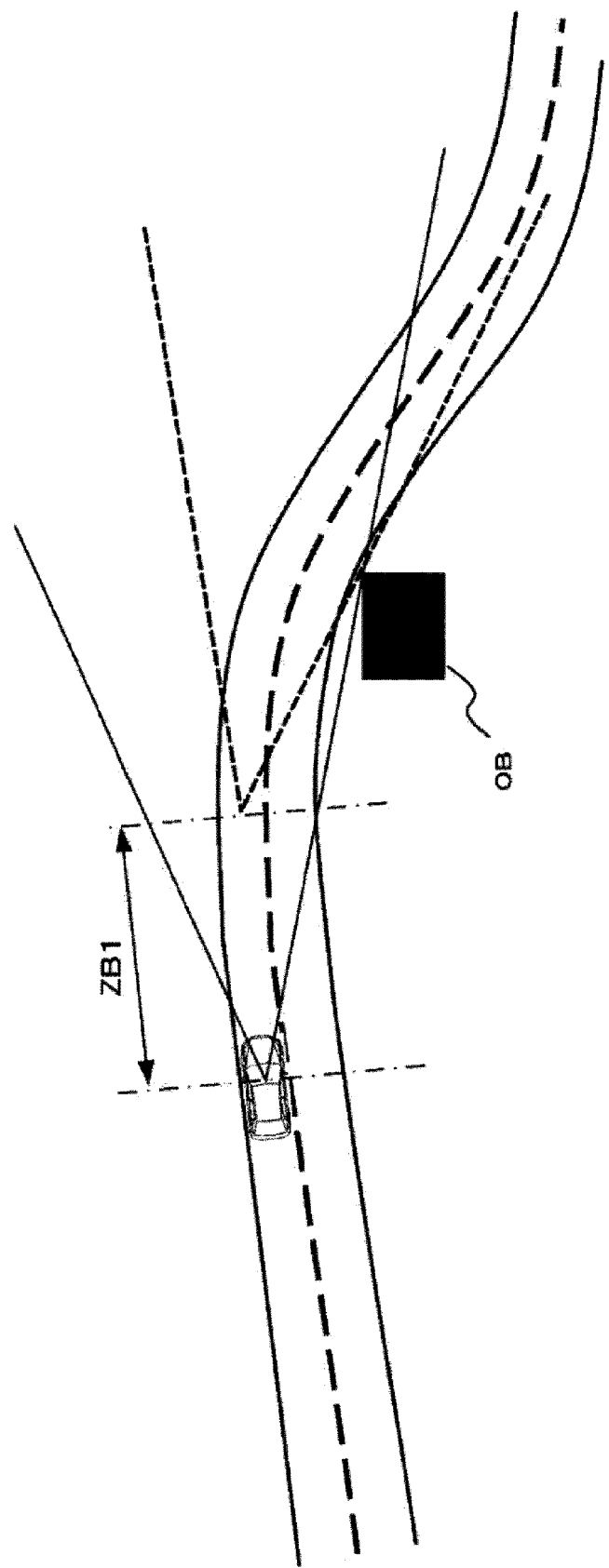

[Fig. 15]
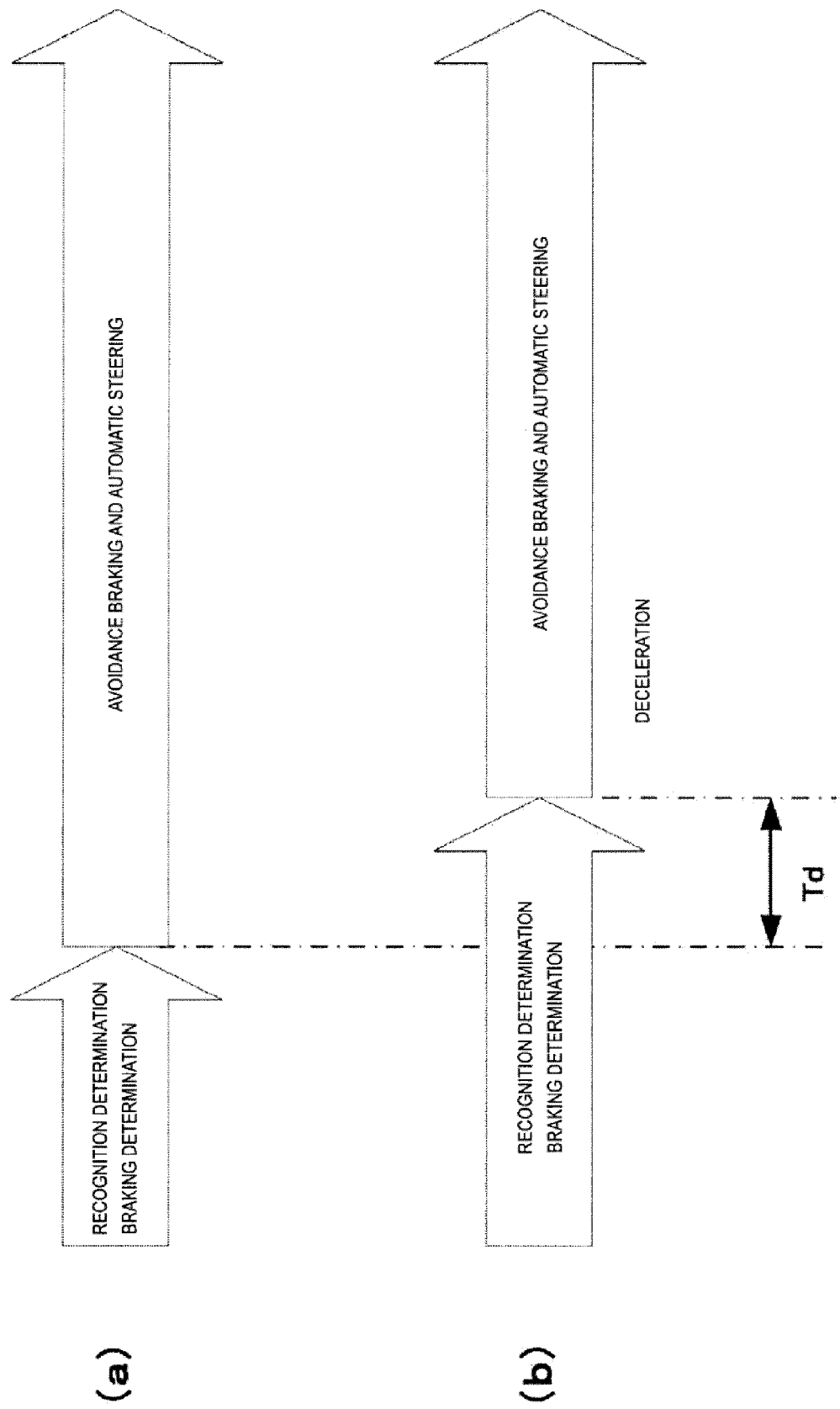

[Fig. 16]
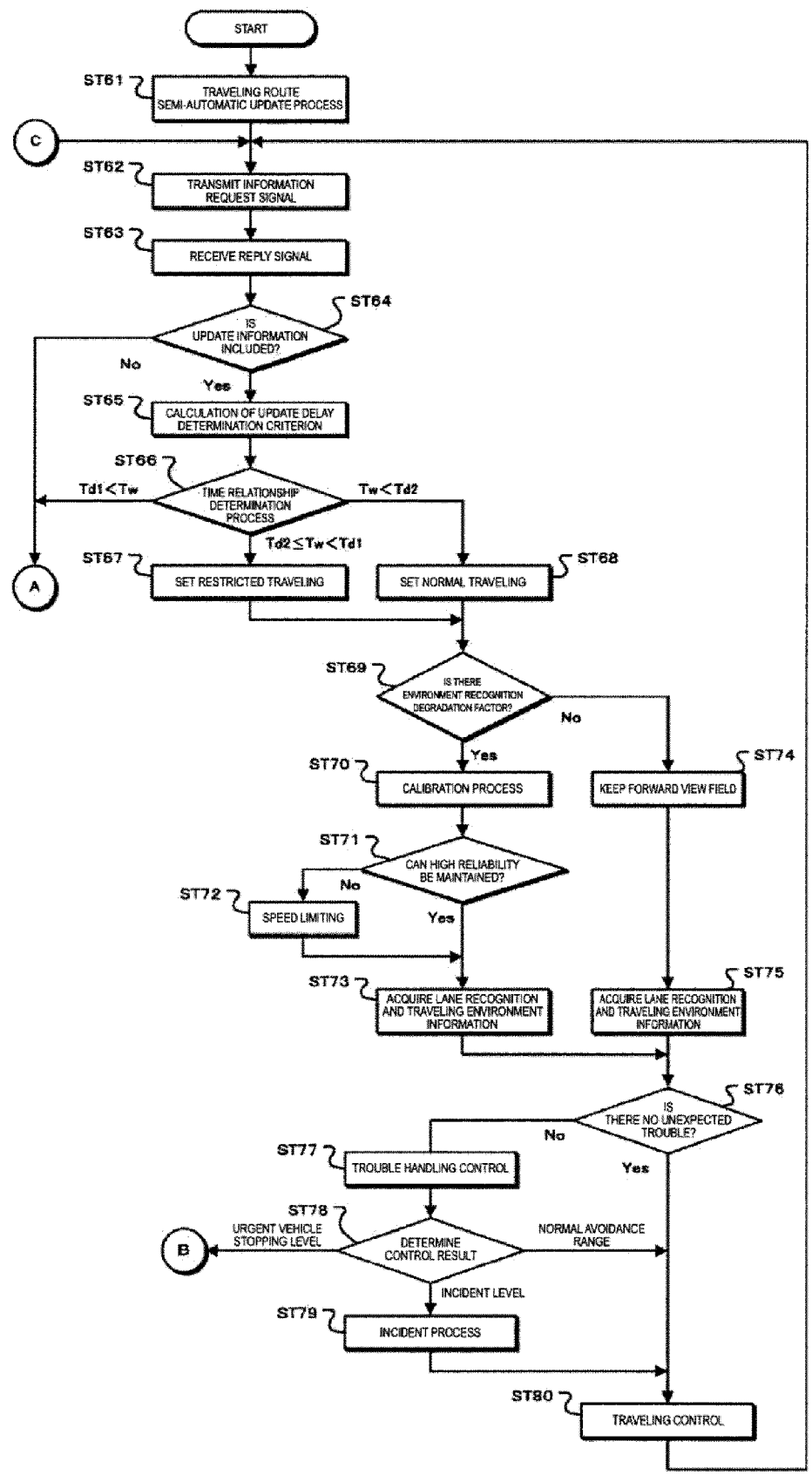

[Fig. 17]
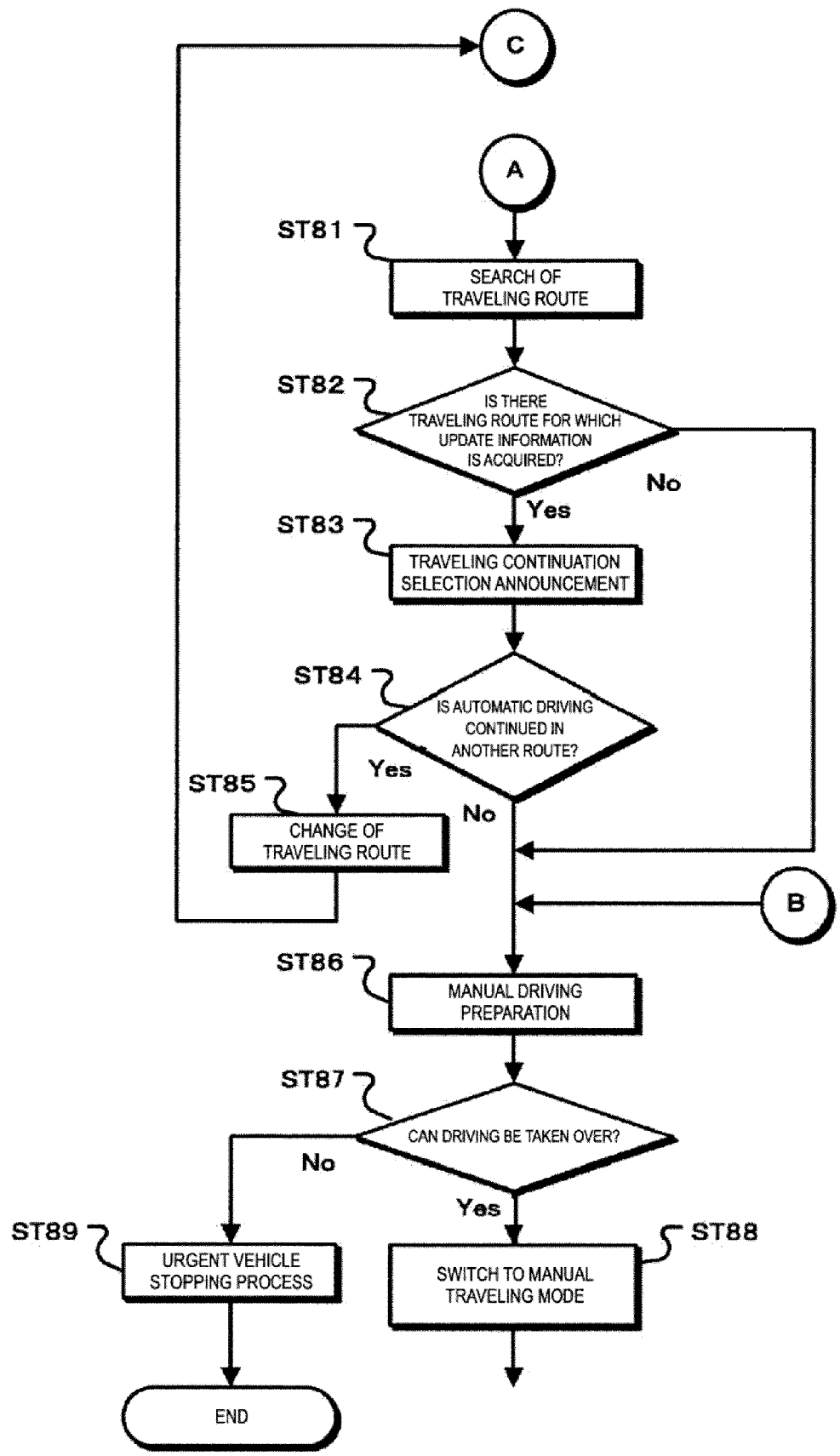

VEHICLE CONTROL DEVICE, VEHICLE CONTROL METHOD, INFORMATION PROCESSING APPARATUS, AND TRAFFIC INFORMATION SUPPLYING SYSTEM

CROSS REFERENCE TO RELATED APPLICATIONS

This application claims the benefit of Japanese Priority Patent Application JP 2015-162030 filed Aug. 19, 2015, the entire contents of which are incorporated herein by reference.

TECHNICAL FIELD

This technology relates to a vehicle control device, a vehicle control method, an information processing apparatus, and a traffic information supplying system, and executes a traveling control of a vehicle by using information of a high degree of reliability relevant to a traveling environment.

BACKGROUND ART

A traffic information supplying system of the past supplies traffic information to a vehicle via a broadcast signal, a light beacon, a radio wave beacon, or the like, as well as collects traffic information by a vehicle itself to upload the collected traffic information to a traffic information management side by wireless communication or the like. For example, in PTL 1, information of a range and a degree of an influence to a surrounding road is delivered to a vehicle, when an emergent event occurs.

CITATION LIST

Patent Literature

PTL 1: JP 4972565B

SUMMARY

Technical Problem

In the meantime, in recent years, the technology relevant to automatic driving of a vehicle is researched. In the automatic driving, a vehicle acquires information relevant to a traveling route and information relevant to a traveling environment, for example an obstacle or the like on a traveling route, and a traveling control is performed on a basis of the acquired information. However, a traveling environment changes with the passage of time, and the information relevant to the traveling environment decreases its degree of reliability as time passes since generation of this information. Further, in order to deploy a road network that enables the automatic driving in a wide area, it is desirable that the information relevant to the traveling environment is easily generated.

Thus, this technology provides a vehicle control device, a vehicle control method, an information processing apparatus, and a traffic information supplying system, which can execute a traveling control of a vehicle by using information of a high degree of reliability relevant to a traveling environment.

Solution to Problem

According to a first exemplary embodiment, the specification is directed to a system for an autonomous vehicle, the system including: a communication interface configured to receive driving environment information corresponding to a driving environment provided by another autonomous vehicle; and circuitry configured to determine a navigation route based on a degree of reliability of the driving environment information provided by the another autonomous vehicle.

The system of may be an electronic system configured to be implemented by the autonomous vehicle.

The system may further configured to control an driving system of the autonomous vehicle based on the navigation route determined based on the degree of reliability of the driving environment information.

The system may be one or more servers.

According to another exemplary embodiment, the specification is directed to a system for implementation in an autonomous vehicle, the system including: a communication interface configured to receive, from one or more servers, driving environment information corresponding to a driving environment provided by another autonomous vehicle; and circuitry configured to: determine a navigation route based on a degree of reliability of the driving environment information received from the one or more servers; and control a driving system of the autonomous vehicle based on the determined navigation route.

According to another exemplary embodiment, the specification is directed to a system for implementation by an autonomous vehicle, the system including: a communication interface configured to receive driving environment information corresponding to a driving environment provided by another autonomous vehicle; and circuitry configured to control the autonomous vehicle to follow a navigation route determined based on a degree of reliability of the driving environment information provided by the another autonomous vehicle; identify differences between the driving environment information provided by the another autonomous vehicle and characteristics of the driving environment detected by the autonomous vehicle; and control the communication interface to transmit driving information indicating the differences between the driving environment information provided by the another autonomous vehicle and the characteristics of the driving environment detected by the autonomous vehicle.

According to another exemplary embodiment, the specification is directed to a method implemented by a system configured for use in an autonomous vehicle, the method including: receiving, by a communication interface of the system, driving environment information corresponding to a driving environment provided by another autonomous vehicle; controlling, by circuitry of the system, the autonomous vehicle to follow a navigation route determined based on a degree of reliability of the driving environment information provided by the another autonomous vehicle; identifying, by the circuitry, differences between the driving environment information provided by the another autonomous vehicle and characteristics of the driving environment detected by the autonomous vehicle; and controlling, by the circuitry, the communication interface to transmit information indicating the differences between the driving environment information provided by the another autonomous vehicle and the characteristics of the driving environment detected by the autonomous vehicle.

Advantageous Effects of Invention

According to this technology, the traveling environment acquiring unit acquires the traveling environment information indicating the traveling environment of the host vehicle. Alternatively, the communication unit acquires the following time traveling environment information generated on the basis of the change of the traveling environment detected by the vehicle that travels after a specific time relative to the traveling environment indicated by the specific time traveling environment information indicating the traveling environment of the specific time. The traveling environment information processing unit searches for the traveling route by using the acquired following time traveling environment information, and the traveling control processing unit executes the traveling control of the host vehicle in the searched-for traveling route, by using the acquired traveling environment information and the following time traveling environment information. This enables the traveling control of the vehicle by using the information of a high degree of reliability relevant to the traveling environment. Note that the effects described in the present specification are just examples and are not limitative, and there may be additional effects.

BRIEF DESCRIPTION OF DRAWINGS

FIG. 1 is a diagram for describing basic map data.
FIG. 2 is a diagram for describing temporary change map data.
FIG. 3 illustrates a difference between change map data information and a newest site situation.
FIG. 4 is a diagram for describing update information.
FIG. 5 is a diagram for describing a configuration of a traffic information supplying system.
FIG. 6 is a diagram illustrating an operation in a traffic information supplying system.
FIG. 7 is a diagram illustrating a configuration of a vehicle control device.
FIG. 8 is a flowchart illustrating an operation of a vehicle control device.
FIG. 9 is a flowchart illustrating an operation of a traveling route setting process.
FIG. 10 is a flowchart illustrating a process relevant to acquisition and update of traveling environment information.
FIG. 11 is a diagram illustrating an operation utilizing uploaded information.
FIG. 12 is a diagram for describing a case of upload of difference information.
FIG. 13 is a diagram illustrating a case in which acquisition of a forward traveling environment is restricted by an up-down gradient of a road.
FIG. 14 is a diagram illustrating a case in which a road curves.
FIG. 15 is a diagram illustrating a case in which a vehicle performs braking on the basis of a recognition result of a traveling environment.
FIG. 16 is a diagram for describing another operation of a vehicle control device.
FIG. 17 is a diagram for describing another operation of a vehicle control device.

DESCRIPTION OF EMBODIMENTS

In the following, a mode for carrying out the present technology will be described. Note that description will be made in the following order. 1. With Regard to Traffic Information Supplying System
   1-1. Configuration of Traffic Information Supplying System
   1-2. Operation in Traffic Information Supplying System
   2. With Regard to Vehicle Control Device
   2-1. Configuration of Vehicle Control Device
   2-2. Operation of Vehicle Control Device
   2-3. Case of Upload of Difference Information
   2-4. Case in Which Traveling Environment Information is to be Supplied, Prior to Traveling Zone
   2-5. Another Operation of Vehicle Control Device <1. With Regard to Traffic Information Supplying System>

In automatic driving of a vehicle, a host vehicle is to accurately recognize a lane on which the host vehicle can travel, and if a traveling vehicle can recognize an accurate position, the traveling vehicle can perform autonomous traveling along a desired traveling lane on the basis of accurate map data and the recognized vehicle position. Also, if the host vehicle acquires information such as an obstacle in a steering range that the host vehicle is allowed to travel on the traveling lane, the host vehicle can travel under a driving rule, avoiding such obstacle automatically. Further, the traveling environment changes in various factors with the passage of time, and therefore information indicating the latest traveling environment is to be acquired in the control of traveling. Also, the vehicle can recognize a course forward situation to a certain extent, but is not necessarily be able to determine the situation accurately under any condition.

Thus, a traffic information supplying system of the present technology supplies newer improved traveling environment information to execute a traveling control. Specifically, the traffic information supplying system of the present technology complements incompleteness and change of information, by using following time traveling environment information according to a traveling environment detected by a vehicle that travels after a specific time, relative to specific time traveling environment information indicating a traveling environment of the specific time, and executes a traveling control by using the complemented traveling environment information. Note that a specific time for which a traveling environment is indicated by specific time traveling environment information is not limited to a specific time point, but may include a specific time period for which time points of a start and an end are set. The traveling control may use reliability degree information. The reliability degree information is a factor related to assurance of the traveling environment information, and for example a tag of an acquisition timing history of the traveling environment information may be included additionally.

Specific time traveling environment information indicating the traveling environment of a specific time is basic map data DE1 indicating the traveling environment of a specific year and month based on design information and measured data obtained by a measurement survey vehicle or the like, for example. Also, the specific time traveling environment information indicating the traveling environment of a specific time is updated basic map data DE1' in which changes of the traveling environment relevant to a newly opened road, structure change (increase of the number of lanes, etc.), lane width change, overtaking lane change, or the like are reflected in the basic map data DEL Note that the updated basic map data DE1' may be map data indicating differences relative to the basic map data DEL Table 1 illustrates information included by the basic map data or the updated basic map data. The basic map data DE1 and the updated basic map data DE1' includes A) on-road marker information, B) outside-road landmark information, and C) road left-right & up-down information, for example.

The on-road marker information includes size information X (lateral) in a lateral direction and size information Y (Longitudinal) of a front-back direction of an on-road marker, type information (color, dashed line, overtaking prohibition, bus line, crosswalk, . . . ) of an on-road marker, and the like. The outside-road landmark information includes size information X (lateral) in the lateral direction and size information Y (Longitudinal) in the front-back direction and height information of an outside-road landmark, a classification type (marker, traffic signal, three-dimensional object, guardrail, pole, . . . ) of an outside-road landmark, and the like. The road left-right & up-down information includes road gradient information, gradient differ-entiation information that can be converted to a look-down limit angle of a road white line described later, for example.

TABLE 1

| Basic Map Data DE1, Updated Basic Map Data DE1' |
| --- |
| A. on-road marker information:<br>X (lateral), Y (longitudinal), type (color, dashed line, overtaking prohibition, bus, crosswalk, . . .)<br>B. outside-road landmark information:<br>X (lateral), Y (longitudinal), height, classification (marker (type), signal (type), three-dimensional object, guardrail, pole, . . .)<br>C. road left-right & up-down information<br>(N. look-down limit angle information of road white line) |

The specific time traveling environment information indicating the traveling environment of a specific time period is temporary change map data DE2 indicating changes of a temporary traveling environment within a specific time period relative to the basic map data, and is the data for which the degree of certainty is not obtained in relation to the actual condition. Note that, when the temporary change continues in subsequent traveling environment, the updated basic map data DE1' is the information of the basic map data DE1 that is updated with the temporary change map data DE2, for example.

Table 2 illustrates information included by the temporary change map data. For example, the temporary change map data DE2 includes A) information of whether a landmark has disappeared, B) coordinate movement prediction vector relative to the basic map data and its certainty degree information, C) lane width change information, D) information of presence or absence of a vicinity worker, E) speed limit change information, F) speed limit information by road surface processing, up-down, or like, and information of presence or absence of a bump, G) location and coordinate of a change forenotice landmark, for example. Note that the temporary change map data DE2 may include an error and the degree of reliability of this information.

TABLE 2

| Temporary Change Map Data DE2 |
| --- |
| A. information of whether a landmark has disappeared<br>B. coordinate movement prediction vector relative to basic map data information and certainty degree information<br>C. lane width change information<br>D. information of presence or absence of vicinity worker |

TABLE 2-continued

| Temporary Change Map Data DE2 |
| --- |
| E. speed limit change information<br>F. speed limit information by road surface processing, up-down, or the like, information of presence or absence of bump<br>G. location and coordinate of change forenotice landmark |

The following time traveling environment information is information reflecting the change of the traveling environment acquired in advance by a vehicle that travels after a specific time, and is short-term information as compared with the specific time traveling environment information. The advance traveling vehicle that travels before the host vehicle and after the specific time can recognize:
  an interim route change and a regulation by an accident or the like generated on a scheduled route,
  a dropped object on a lane, and a line segment that emerges with dropping liquid or the like of a forward traveling vehicle,
  temporary road taint such as oil,
  presence or absence of recognition trouble associated with freeze or the like,
  an erroneous recognition factor such as a road crack,
  influence of environmental light and wet road surface,
  repair material of a different reflectance of a crack repair line (subparallel lane crack at a vicinity of a boundary created along a trace of an old white line mark as a result of road repair of each lane, etc.),
  a shadow of a surrounding road parallel object and an adjacent traveling vehicle, an electric wire shadow, a shadow of guardrail and protection wall, or the like, by influence of external light, and
  change of a traveling environment such as a road surface reflection by a rut puddle of an oncoming vehicle head lamp and a street light. The advance traveling vehicle uploads the traveling environment change information indicating the change of the traveling environment to an information administrator side from the advance traveling vehicle, as described later. The information administrator side generates update information Ps used to recognize in advance the change of the traveling environment in the vehicle that travels thereafter, by data analysis using the accumulated basic map data and the difference information and the difference information that is newly uploaded from the traveling vehicle. The update information Ps is the following time traveling environment information, and is the traveling environment information built timely for the vehicle that travels thereafter. Here, the information administrator indicates an entire scheme of an information management center 12 that includes a local cloud server and a master server that collect and analyze and deliver the information of the vehicle traveling road, and does not indicate a person or the like having characteristics of performing management.

Table 3 illustrates update information. For example, the update information Ps includes A) information of whether a map landmark has disappeared, B) information of type and coordinate of a newly emerged obstacle, C) coordinates of change forenotice in the temporary change map data DE2 and a Gaussian distribution σ value of degree of correctness of the coordinates, D) change information of lane width detection value, E) information of presence or absence of a vicinity worker, F) speed limit change information, and G) speed limit such as road surface processing and up-down, and information of presence or absence of a bump, or the like. Also, the update information Ps includes H) location and coordinate of change forenotice landmark, I) information such as double layered utilization of a road surface marker (applying and overlapping on an old mark), provisional painting, provisionally applied tape marker, J) change information of restriction, for example an allowable maximum speed (slowing down due to construction work and occlusion occurrence environment, and slowing down due to low visibility by neighborhood fire or the like, etc.), K) incident information, L) walker emergence risk information (school zone, day of week & time zone, etc.), M) oncoming vehicle coming-out risk factor information (oncoming two lanes, a street-parking vehicle on an oncoming-lane, an obstacle on an oncoming lane, etc.), N) information of a look-down limit angle of a road white line, O) information of a view angle blocking occurrence section, and P) information of presence or absence of time-dependent recognition rate fluctuation factor, a factor label, or the like.

TABLE 3

Update Information Ps

A. whether map landmark has disappeared,
B. newly emerged obstacle, type and coordinate information,
C. coordinates of change forenotice in temporary change map data DE2 and its Gaussian distribution σ value of degree of correctness of coordinate (for example, index of circle and ellipse region of existence position probability of 90% or more),
D. change of lane width detection value,
E. information of presence or absence of vicinity worker,
F. speed limit change information,
G. speed limit due to road surface processing and up-down, presence or absence of bump,
H. location and coordinates of change forenotice landmark,
I. presence or absence of double layered utilization of road surface marker (applying and overlapping on old mark), provisional painting, provisionally applied tape marker, etc.
J. change information of restriction, allowable maximum speed (slowing down due to construction work, etc.), low visibility due to occlusion occurrence environment, and construction work and neighborhood fire, etc.
K. incident information,
L. walker emergence risk (school zone, day of week & time zone, etc.),
M. oncoming vehicle coming-out risk factor (oncoming two lanes, street-parking vehicle on oncoming-lane, obstacle on oncoming lane, etc.) of risk information,
N. look-down limit angle information of road white line,
O. information of view angle blocking occurrence section,
P. presence or absence of time-dependent recognition rate fluctuation factor, factor label, and backlight, . . . , The reliability degree information is traveling environment information, that is, a factor related to assurance of the specific time traveling environment information and the following time traveling environment information, as described above. The reliability degree information is information of numerical conversion, classification, ranking, and the like executed to a factor that decreases its recognition rate, when performing a recognition process of on-road marker, outside-road landmark, and the like, by priority searching on the basis of the basic map data DE1, DE1' and the temporary change map data DE2, for example.

The reliability degree information is information relevant to constant decrease of the degree of reliability, and information relevant to non-constant decrease of the degree of reliability, for example reflection that momentarily changes by the change of environmental light, snowfall, wetting, information relevant to occurrence of temporary fog. Also, the reliability degree information may be information with identification code, when predictable by air temperature, weather forecast, or the like, and when the degree of reliability decreases in a periodic cycle such as time zone. The reliability degree information is used in selection of a traveling route and traveling control of automatic driving.

Table 4 illustrates factors that decrease a recognition rate in the reliability degree information. For example, in the reliability degree information Fs, the recognition decrease factors are aging degradation information of each lane marker (abrasion, cracking degradation, chipping, boundary blurring, vicinity road crack, repair boundary line, etc.), information of deposition of sand, deposited snow, and snow melting agent dispersal, construction work related information (interim tape application, mixed utilization, temporary blocking occurrence of view angle, etc.). Also, in the reliability degree information Fs, the recognition decrease factors are information of re-emergence of old mark, fuzzy boundary information by puddle and wetting, freezing, and the like, information of occurrence and time point of recognition difficult situation by external light reflection and the like, information of interim moving marker (construction work start notice, etc.), and information of moving boundary and ambiguous boundary during construction work. Also, in the reliability degree information Fs, the recognition decrease factors are location information of provisional accident announcing pylon, information of road temporary taint and dropped object, erroneously detected road crack, presence or absence of shade occurrence, erroneously detected risk information, detectable distance, information of fog, snow, and rainy weather sight distance and like, and traveling lane & vicinity incident information. Further, in the reliability degree information Fs, the recognition decrease factors are information of forward traveling vehicle irregular traveling history (rapid deceleration, rapid steering), and information such as interfering object occurrence risk on a route in an event, and the like. In the reliability degree information, numerical conversion is performed to the factors illustrated in the table 4, and for example, as the influence on the automatic driving becomes larger, a larger numerical value is assigned. Also, the factors illustrated in the table 4 are classified into the factors for which a detection mode is desirable to be switched, the factors for which deceleration in automatic driving is to be performed, and the factors for which an instruction to manual driving operation is to be performed. Further, ranking is performed within the classification on the basis of the assigned numerical value. In the automatic driving of the vehicle, traveling control, such as deceleration, instruction to manual driving operation, and switching of the detection mode, are executed on the basis of this reliability degree information, in order to robustly detect an on-road marker, an outside-road landmark, and the like. The manual driving operation in the present technology is not limited to driving operation by a manual transmission, but is general driving operation which a driver intervenes the driving operation.

TABLE 4

Reliability Degree Information Fs i) wear-out due to aging degradation of each individual lane marker of lane
marker (abrasion, cracking degradation, chipping, boundary blurring, vicinity road crack, and repair boundary line), reliability degree factor on detection white line
ii) deposition of sand, snow melting agent, deposition of deposited snow, temporary rut --> combined robust detection mode switching, and calling for attention to deceleration and manual driving in response to erroneous detection situation TABLE 4-continued Reliability Degree Information Fs iii) interim tape application of construction work, mixed utilization, occurrence situation of temporary blocking of view angle
iv) re-emergence of old mark -->
slowing down or deceleration in response to its level,
v) fuzzy boundary due to puddle, wetting, freezing, . . .
vi) occurrence and time point information of difficult recognition situation by external light reflection and like -->
robust detection mode switching, calling for attention to deceleration or manual driving in response to erroneous detection
vii) interim moving marker (construction work start notice, etc.)
viii) moving boundary and ambiguous boundary during construction work --> change to advance slowing down traveling
ix) provisional accident announcing pylon located --> deceleration traveling
x) road temporary taint, dropped object,
xi) erroneously detected road crack, presence or absence of shade occurrence, erroneously detected risk information -->
robust detection mode switching, calling for attention to deceleration or manual driving in response to erroneous detection
xii) detectable distance, fog, snow, rainy weather sight distance information --> switching to deceleration traveling in response to situation
xiii) incident information of traveling lane and vicinity
xiv) forward traveling vehicle irregular traveling history (rapid deceleration, rapid steering) --> switching to deceleration traveling in response to situation
xv) occurrence risk of interfering object on route in event and like, in vicinity road as well, around soccer game stadium, . . . --> switching of deceleration traveling Next, specific examples of reliability degree information are illustrated in the table 5 and 6. The pavement types are a) good drainage improved asphaltic pavement, b) normal asphalt, c) concrete block (difficult to distinguish between white and yellow), d) mixed repair (occurrence risk of an erroneously recognized line at a repair boundary), and e) road during repair construction work (occurrence risk of erroneous recognition such as repair work association), for example.

The states of the lane marker are a) non-degraded after construction (low erroneous recognition risk), b) existence of degradation after construction & low erroneous detection risk, c) existence of degradation after construction (occurrence of erroneous detection of part, complement detection is to be performed to maintain accuracy), d) existence of partial wear-out, prediction complement control is to be performed between before and after 50 m, e) existence of partial wear-out, prediction complement control is to be performed between before and after 100 m, f) wear-out degradation and white line disappearance section, and g) existence of partial wear-out, and prediction is difficult, for example. Primary factor events that occur in the lane marker are h) taint, oil film (according to erroneous recognition factor risk level), i) deposition of sand, deposited snow, puddle map, sump water invasion map, j) deposited snow rut, snow melting agent, rut puddle, freezing, k) interim tape application marker of construction work, m) erroneous recognition factor map by neighboring object shadow image at specific time and season, n) unclassified mixed duplex erroneous recognition factor, and p) non-white line marker (Pod Dots, point depiction), for example.

Types of road boundaries are a) L-shaped groove, b) curbstone, c) curvature curbstone without verge, d) stone wall, e) presence or absence of three-dimensional object in road surface boundary (telephone pole, road marker, entrance prevention fence, . . . ), and f) speed limiting bump, for example.

Further, a marker chipping and defect frequency is a) 0% to 20%, b) 20% to 40%, c) over 40% for example, and is sometimes continuous defect or unpredictable. Further, there are items for landmark coordinate reference marker objects that disappear, are broken, become less recognizable due to deposited snow and the like, and move.

Ranking of the degree of reliability of detection information is performed to these items as in table 5 and 6. For example, an update frequency, a detection information reliability coefficient, and an erroneous recognition risk coefficient are set. Also, a risk that directly connects to an accident is low despite overlooking in a road straight line section, but on the other hand, even a temporary lack of information increases the risk extremely in a section where it is difficult to see an oncoming vehicle on a road having many left-right curves. Thus, in the case of straight road and in the case of curved road, the risk is set as illustrated in the table 5 and 6, to the aforementioned pavement type and the lane marker state of the road surface, as the travel risk due to the detection overlooking and the like. Note that whether the road is a straight line section or have many left-right curves may be determined on the basis of the basic map data DE1, DE1'.

Also, the degree of reliability of lane information adjacent to the lane where the host vehicle travels is substantially equal with respect to the pavement type of the road surface (coefficient=1). However, difference information relative to the basic map data and the temporary change map data is uploaded, for a mixed repair road and a road during repair construction work, with respect to detection coordinate error information for the basic map data DE1, DE1' and the temporary change map data DE2 or the like. Also, the difference information is uploaded for the state of the lane marker on the road surface, or when disappearance, breakage, or the like of the landmark occurs to generate a difference from the acquired information.

Note that table 5 and 6 illustrates measures to the uploaded reliability information, and processes to which circle marks are set, for example white line intensive detection, travelable road surface region estimation, adjacent boundary object detection, etc., are selectively performed as illustrated with circle marks. Also, ranking of the items illustrated in table are performed, when autonomous automatic traveling is performed with braking control inter-vehicle margin of inter-vehicle distance and upper speed limit reduction, or when manual driving is prioritized. Further, with regard to non-urgent low speed safe driving measures in the case of prioritizing automatic low speed movement and the corresponding road, availability or unavailability of the measures to the items described in the table is determined, and driving control is performed on the basis of the ranking and the determination result.

TABLE 5

| | running environment information rank. classification | update frequency | update upload detection information reliability | erroneous recognition risk coefficient | measures — straight road | measures — curved road | prioritize intensive detection of white line | prioritize run-able road surface region estimation | adjacent boundary object detection | correction of recognition detection at time of rainy weather | cruise control for low elevation angle corresponding enterance | braking control inter-vehicle margin with inter-vehicle distance | autonomous running automatic with upper speed limit reduction | manual | safe driving measure at low speed |
|---|---|---|---|---|---|---|---|---|---|---|---|---|---|---|---|
| pavement type | a) good drainage improved asphaltic pavement | regular | 1 | 0 to 0.5 | 0 to 0.2 | 0.5 to 1 | ○ | | | | | | | 0 | |
| | b) normal asphalt | regular | 1 | 0 to 0.6 | 0 to 0.2 | 0.5 to 1 | ○ | ○ | | | | | | 0 | OK |
| | c) concrete block (difficult to distinguish between white and yellow) | regular, as appropriate | 1 | 0 to 0.7 | 0 to 0.2 | 0.5 to 1 | | ○ | | | | | | 0 | OK |
| | d) mixed repair (occurrence risk of an erroneously recognized line at a repair boundary) | regular, as appropriate | 1 | 0.1 to 1 | 0 to 0.2 | 0.5 to 1 | | ○ | ○ | | | | | 0 | OK |
| | e) road during repair construction work (occurrence risk of erroneous recognition such as repair work association) | if changed, immediately, as appropriate | 1 | 0.2 to 1 | 0 to 0.2 | 0.5 to 1 | | ○ | ○ | | | | | 0 | OK |
| lane marker state | a) non-degraded after construction (low erroneous recognition risk) | as appropriate | 1 | 0 | 0 to 0.2 | 0.5 to 1 | ○ | ○ | | | | | | 0 | OK |
| | b) existence of degradation after construction & low erroneous detection risk | as appropriate | 1 | 0 to 0.5 | 0 to 0.2 | 0.5 to 1 | | ○ | ○ | | | | | 0 | OK |
| | c) existence of degradation after construction, occurance of erroneous detection of part, complement detection is to be performed to maintain accuracy | as appropriate | 0.8 | 0 to 0.6 | 0.1 to 0.5 | 0.7 to 1 | | ○ | ○ | | | 0.2 to 0.6 | ↓ | 0.2 | OK |
| | d) existence of partial wear-out, prediction complement control is to be performed between before and after 50 m | as appropriate | 0.5 | 0.1 to 1 | 0.1 to 0.5 | 0.7 to 1 | | ○ | ○ | | | 0.3 to 0.7 | ↓ | 0.3 | OK |

TABLE 5-continued

| | | | | | | | | | | |
|---|---|---|---|---|---|---|---|---|---|---|
| e) existence of partial wear-out, prediction complement control is to be performed between before and after 100 m | regular, as appropriate | 0.4 | 0.2 to 1 | 0.1 to 0.5 | 0.7 to 1 | | | 0.5 to 1 | ↓ | 0.5 | OK |
| f) wear-out degradation and white line disappearance section | regular, as appropriate | 0.2 | 0.5 to 1 | 0.1 to 0.5 | 0.7 to 1 | | | 0.5 to 1 | ↓ | 0.8 | OK |
| g) existence of partial wear-out, and prediction is difficult primary factor event | regular, as appropriate | 0 | 1 | 0.6 to 1 | 0.8 to 1 | | | 0.5 to 1 | ↓ | 1 | NG |
| h) taint, oil film (according to erroneous recognition factor risk level) | if changed, immediately, as appropriate | 0 to 1 | 0.1 to 1 | | | ○ | | 0.5 to 1 | ↓ | 0 to 1 | OK |
| i) deposition of sand, deposited snow, water pool map, sump water invasion map | if changed, immediately, as appropriate | 0 to 1 | 0.1 to 1 | | | | ○ | 0.5 to 1 | ↓ | 0 to 1 | OK |
| j) deposited snow rut, snow melting agent, rut water pool, freezing | if changed, immediately, as appropriate | 0 to 1 | 0.1 to 1 | | | ○ | | 0.5 to 1 | ↓ | 0 to 1 | OK |
| k) interim tape application marker of construction work | if changed, immediately, as appropriate | 0 to 1 | 0.1 to 1 | | | ○ | | 0.5 to 1 | ↓ | 0 to 1 | OK |
| m) erroneous recognition factor map by neighboring object shadow image at specific time and season | if changed, immediately, as appropriate | 0 to 1 | 0.1 to 1 | | | ○ | | 0.5 to 1 | ↓ | 0 to 1 | OK |
| n) unclassified, mixed duplex erroneous recognition factor non-white-line markers | if changed, immediately, as appropriate | 0 to 1 | 0.1 to 1 | | | | | 0.5 to 1 | ↓ | 0 to 1 | OK |
| p) non-white line marker (Pod Dots, point depiction) | if changed, immediately, as appropriate | 0 to 1 | 0.1 to 1 | | | | | 0.5 to 1 | ↓ | 0 to 1 | OK |

TABLE 6

| running environment information rank. classification | | update upload | | | | | measures | | |
|---|---|---|---|---|---|---|---|---|---|
| | | update frequency | detection information reliability | erroneous recognition risk coefficient | straight road | curved road | prioritize intensive detection of white line | prioritize run-able road surface region estimation | adjacent boundary object detection |
| road boundary type | a) L-shaped groove | as appropriate | 0 to 1 | 0 to 1 | | | | | o |
| | b) curbstone | as appropriate | 0 to 1 | 0 to 1 | | | | | o |
| | c) curvature curbstone without verge | as appropriate | 0 to 1 | 0 to 1 | | | | | o |
| | d) stone wall | as appropriate | 0 to 1 | 0 to 1 | | | | | o |
| | e) presence or absence of three-dimensional object in road surface boundary (telephone pole, road marker, enterance prevention fence, . . . ) | as appropriate | 0 to 1 | 0 to 1 | | | o | | |
| | f) speed limiting bump | as appropriate | 0 to 1 | 0 to 1 | | | | | o |
| marker chipping and defect frequency | a) 0% to 20% | as appropriate | | 0.9 | | | | o | |
| | b) 20% to 40% | as appropriate | | 0.7 | | | | o | |
| | c) over 40% | as appropriate | | 0.3 | | | | o | |
| | continuous defect, predictability | | | 0.1 | | | | | |
| landmark | movement disappearance, breakage disappearance, breakage deformation, low recognition due to deposited snow, relative adjacent movement | if changed, immediately, as appropriate | 0 to 1 | | | | | | |

| | | measures | | | | | |
|---|---|---|---|---|---|---|---|
| | | correction of recognition detection at time of rainy weather | cruise control for low elevation angle corresponding enterance | braking control inter-vehicle margin with inter-vehicle distance | autonomous automatic running with upper speed limit reduction | manual | safe driving measure at low speed |
| road boundary type | a) L-shaped groove | | | | | 0 to 1 | OK |
| | b) curbstone | | | | | 0 to 1 | OK |
| | c) curvature curbstone without verge | | | | | 0 to 1 | OK |
| | d) stone wall | | | | | 0 to 1 | OK |
| | e) presence or absence of three-dimensional object in road surface boundary (telephone pole, road marker, enterance prevention fence, . . . ) | | | | | 0 to 1 | OK |
| | f) speed limiting bump | | | | o | 0 to 1 | OK |
| marker chipping and defect frequency | a) 0% to 20% | | | 0.1 to 0.5 | ← | 0 to 0.5 | OK |
| | b) 20% to 40% | | | 0.3 to 0.7 | ← | 0 to 0.8 | OK |
| | c) over 40% | | | 0.5 to 1 | ← | 1 | OK |
| | continuous defect, predictability | | | | | | |
| landmark | movement disappearance, breakage disappearance, breakage deformation, low recognition due to deposited snow, relative adjacent movement | | | | | | |

Note that the information illustrated in the table 1 to the table 3 and the factors that decreases the recognition rate illustrated in the table 4, and the reliability degree information illustrated in the table 5 and 6 are just examples, and may be configured to include only information of a part in the tables, and may be configured to include information, coefficients, or the like which are not illustrated in the tables.

FIG. 1 is a diagram for describing the basic map data. The basic map data DE1 is the information indicating the traveling environment of a specific time, and the updated basic map data DE1' is the information updated at a predetermined frequency (for example, a frequency of once in several months), and includes information of a landmark of an intersection.

FIG. 2 is a diagram for describing change map data as a temporary plan. The temporary change map data DE2 includes information such as a change of a lateral range of a traveling lane and a change of a speed limit associated with to road construction work or the like which are planned in advance. Specifically, the temporary change map data DE2 is updated at an appropriate time in response to an application of the road construction work schedule or the like. In the road construction work, provisional marking movement of the white line or the like is performed in response to the situation of the site. Thus, in the temporary change map data DE2, section start information, lane number change information, lane width change information, oncoming vehicle information, or the like are presented with errors of several ten meters with respect to the direction of forward movement. Further, the temporary change map data DE2 is updated by applied information, and thus does not have the content that reflects an actual condition of a site automatically, but is supposed to be a human-based operator input to the map system. Hence, it is possible that the degree of reliability of information and the reflection timing of the actual site also change depending on the work time and the situation. Then, this updated travelable range is not the content that reflects the newest site situation of the road, but is just prediction information of temporary change. FIG. 3 illustrates the difference between the information of the temporary change map data and the newest site situation. Note that FIG. 3 (a) is the information indicated by the basic map data DE1, and FIG. 3 (b) is the information indicated by the temporary change map data DE2, and FIG. 3 (c) illustrates the newest site situation. For example, as illustrated in FIG. 3 (b), it is scheduled that construction work markers are put and separation white lines to provisional two lanes are provided at the time of construction work planning, in order to circumvent the construction work schedule lane. However, when only one lane is actually usable as illustrated in FIG. 3 (c) because of actual construction work range enlargement and further lane restriction from construction work circumstances of the road in the site, the difference between the information of the temporary change map data and the newest site situation is generated.

FIG. 4 is a diagram for describing the update information which is the following time traveling environment information. The update information Ps is the information indicating a temporary or continuous change, alteration, or the like of the traveling environment associated with an unanticipated event that occurs temporarily, and the information update is performed in a short period. Also, the update information Ps is the information acquired as appropriate from an information center as advance information of a traveling scheduled route. The update information Ps is generated on the basis of the traveling environment acquired by the advance traveling vehicle before several ten minutes to several hours, for example. Thus, when planned road construction work is stopped due to weather deterioration or the like, and when the construction work range is changed, the traveling environment of the stopped or changed state can be announced to the vehicle, and thus the data having the comparatively high degree of reliability can be obtained. Note that, FIG. 4 illustrates a case in which the update information Ps includes lane marking wear-out information, information indicating a puddle, information such as an unanticipated designated range change such as nearby construction work, interim urgent construction work, house moving work, and accident handling, information of an on-road dropped object, garbage, and the like, and information of road surface crack, repair trace, and external light emphasis level.

When the traveling control is executed by using the specific time traveling environment information and the following time traveling environment information, a special lane that enables autonomous automatic driving is not necessarily provided at all sections from the departure place to the destination place.

In the special lane that enables the automatic driving, the autonomous automatic traveling is enabled with the basic map data DE1 and the updated basic map data DE1', if the road is sufficiently managed. The basic map data DE1 and the updated basic map data DE1' are the data saved in the host vehicle before traveling and the data acquired from a map server or the like accessed at a route selection time point, and can satisfy the information for traveling. However, when the special lane is not provided at the section from the departure place to the destination place, newer fulfilling traveling environment information is to be prepared, in order to pull out at maximum the merit of the automatic driving and partial driving support, at the section where the special lane is not provided.

Thus, before approaching a scheduled traveling route in actual traveling, the host vehicle acquires the temporary change map data DE2 and the update information Ps of the surrounding environment from an information administrator side. Also, the host vehicle executes the traveling control by using the basic map data DE1, DE1', the temporary change map data DE2, and the update information Ps. Further, the host vehicle enables the following vehicle to utilize the new traveling environment information, by detecting the traveling environment on the traveling route and generating the difference information Qs indicating the difference of the basic map data and the temporary change map data from the traveling environment and uploading the generated difference information Qs to the information administrator side.

The information administrator side sequentially accumulates the difference information Qs generated by the traveling vehicle of the vicinity area, and generates the update information Ps on the basis of the accumulated difference information Qs and the basic map data DE1, DE1' and the temporary change map data DE2. Also, the information administrator side supplies the latest update information Ps to the traveling vehicle in order to enable the traveling control. Note that the information administrator side supplies the basic map data DE1, DE1' and the temporary change map data DE2 to the traveling vehicle, when the basic map data DE1, DE1' and the temporary change map data DE2 are not acquired by the traveling vehicle.

<1-1. Configuration of Traffic Information Supplying System>

Next, each device for configuring the above traffic information supplying system will be described.

FIG. 5 is a diagram for describing the configuration of the traffic information supplying system. The traffic information supplying system 10 includes a vehicle 11 that executes the traveling control by using the traveling environment information, and an information management center 12 of the information administrator side that supplies the traveling environment information or the like.

The vehicle 11 has a function for acquiring the traveling environment information from the information management center 12 and executing the traveling control. Also, the vehicle 11 has a function for detecting the traveling environment while traveling and generating the difference information indicating the difference between the traveling environment indicated by the traveling environment information acquired from the information management center 12 and the traveling environment detected while traveling and supplying the generated difference information to the information management center 12.

The information management center 12 has a function for supplying the specific time traveling environment information, for example the basic map data and the temporary change map data, and the following time traveling environment information, for example the update information, and the reliability degree information, to the vehicle 11. Also, the information management center 12 has a function for updating the update information supplied from the information management center 12, to new information, on the basis of the update information supplied from the vehicle 11. Also, the information management center 12 includes a function for updating the basic map data.

The information management center 12 is configured with a master server 121, local servers 122 connected to the master server 121 provided in each area, one or a plurality of communication units 123 connected to the local servers 122, for example.

The master server 121 performs the management of the basic map data of the entire area where the local server 122 is provided, and performs update and creation of the basic map data, and the creation or the like of the temporary change map data. The master server 121 supplies the basic map data and the temporary change map data of the corresponding area, to each local server 122. The update of the basic map data is performed at longer time intervals than the update interval of the information performed by the local server 122. Also, the creation of the temporary change map data may be performed when the schedule of change is known. Note that the master server 121 may perform update and creation of the basic map data or the like, by using the information that the local server 122 that retains.

The local server 122 supplies the basic map data and the temporary change map data of the managed area, to the vehicle 11 via the communication unit 123. Also, the local server 122 accumulates the difference information and the like provided from the vehicle 11 via the communication unit 123. Also, the local server 122 generates the update information indicating the latest difference from the traveling environment indicated by the basic map data and the temporary change map data, on the basis of the basic map data, the temporary change map data, the accumulated difference information, and the like. Further, the local server 122 supplies the update information as the difference information relative to the traveling environment information that the vehicle retains, i.e., the prediction information, to a subsequent traveling vehicle having a scheduled course in the managed area.

As described above, a vehicle that travels a road of a town or the like uploads as appropriate the difference information relative to the map such as the traveling lane and the observable lane, so that highly accurate latest traveling environment information can always be supplied from the local server in a road having a traffic amount of to a certain frequency. Thus, the traveling environment information sufficient for com-plementing the autonomous automatic driving can be acquired and maintained, without acquiring and preparing the infrastructure installed road environment.

<1-2. Operation in Traffic Information Supplying System>

FIG. 6 illustrates the operation in the traffic information supplying system. In step ST1v, the vehicle 11 selects a traveling route on the basis of the saved map data. The vehicle 11 selects a rough traveling route to the destination place on the basis of the saved map data, and proceeds to step ST2v.

In step ST2v, the vehicle 11 requests the information indicating the traveling environment on the selected traveling route. The vehicle 11 performs wireless communication with the local server 122 of the area including the selected traveling route, and requests the traveling environment information by presenting the version of the saved map data.

In step ST1m, the master server 121 creates and updates the map data. The master server 121 updates and creates the basic map data and creates the temporary change map data and the like, and supplies the map data and the temporary change map data after the update of the corresponding area, to the local server 122.

In step ST1c, the local server 122 saves and updates the map data. The local server 122 saves the map data supplied from the master server 121. Also, the local server 122 updates the saved map data to a newly supplied map data, when the map data supplied from the master server 121 is the map data after the update of the saved map data. Further, when the map data supplied from the master server 121 is the map data indicating the difference from the saved map data, the local server 122 updates the map data by using the map data indicating the difference, and proceeds to step ST2c.

In step ST2c, the local server 122 executes a replying process to the request. The local server 122 determines the map data retained by the vehicle 11, on the basis of the version of the map data indicated in the request from the vehicle 11. The local server 122 sends to the vehicle 11 the update information indicating the difference from the determined map data. Also, the local server 122 requests the difference information to the vehicle 11.

In step ST3v, the vehicle 11 executes the traveling control by using the saved map data and the update information. The vehicle 11 performs the autonomous automatic driving for example, assisted by the traveling environment indicated by the saved map data and the update information which is the following time traveling environment information, and proceeds to step ST4v. Also, the vehicle 11 performs update of the saved map data and search of a new traveling route using the update information, by using the update information, and changes the traveling route according to the traveling environment.

In step ST4v, the vehicle 11 executes the replying process of the difference information. The vehicle 11 acquires the forward traveling environment and the like during traveling, while performing position correction, detection accuracy improving adjustment of the marker and the like, correction of safety control, or the like, on the basis of the update information or the like acquired in step ST3v. Also, the vehicle 11 generates a travel map and a route of the observable range to which the host vehicle can proceed, and detects the difference between the traveling environment indicated by the saved map data and the difference information and the traveling environment acquired while traveling. Further, the vehicle 11 sends, to the local server 122, the difference information indicating the difference of the detected traveling environment. An inconsistency of coordinate fluctuation of the map data brings a harmful effect to the position recognition at the time of the autonomous automatic traveling, and thus it is desirable to perform position correction and detection accuracy improving adjustment. Also, it is desirable to update in a ranked manner according to the degree of importance of the difference, such as immediately updating the information of a high degree of urgency depending on the detected matter for the following vehicle, such as narrowing of the observable range by the accident occurrence and the emergent event as other unexpected events.

In step ST3c, the local server 122 processes the difference information. The local server 122 accumulates the difference information supplied from the vehicle 11, and thereafter sends the latest traveling environment information, upon receiving a request for the traveling environment information.

In step ST5v, the vehicle 11 requests the information indicating the next traveling environment on the traveling route. The vehicle 11 requests for the traveling environment information by presenting the version of the saved map data to the local server 122 of the area including the traveling route.

In step ST4c, the local server 122 executes a replying process to the request. The local server 122 determines the map data retained by the vehicle 11, on the basis of the version of the map data indicated in the request from the vehicle 11. The local server 122 sends to the vehicle 11 the update information indicating the difference from the determined map data. Also, the local server 122 requests the difference information to the vehicle 11.

In step ST6v, the vehicle 11 executes the traveling control by using the saved map data and the update information. The vehicle 11 performs the autonomous automatic driving for example, assisted by the traveling environment indicated by the saved map data and the update information, and proceeds to step ST7v. Also, the vehicle 11 performs update of the saved map data and search of a new traveling route using the update information, by using the update information, and changes the traveling route according to the traveling environment.

In step ST7v, the vehicle 11 executes the replying process of the difference information. The vehicle 11 acquires the traveling environment while traveling, and detects the difference between the traveling environment indicated by the saved map data and the difference information and the traveling environment acquired while traveling. Also, the vehicle 11 sends, to the local server 122, the difference information indicating the difference of the detected traveling environment.

In step ST5c, the local server 122 processes the difference information. The local server 122 accumulates the difference information supplied from the vehicle 11, and thereafter sends the latest traveling environment information, upon receiving a request for the traveling environment information.

In the following, as described above, the vehicle 11 requests the traveling environment information and sends the difference information, so that the local server 122 can supply the latest update information to the vehicle that travels that area thereafter, on the basis of the difference information supplied from the vehicle 11.

According to this traffic information supplying system, the traveling environment detection result of the advance traveling vehicle can be utilized in the traveling control of the vehicle that travels thereafter.

In the replying process of the difference information, the vehicle 11 includes host vehicle traveling lane information and information upload range (particularly, lateral direction information) for example, into the difference information that is sent to the local server 122. If the traveling environment that can be acquired is just adjacent one or two lanes when the host vehicle travels a road with three or four lanes at one side, all range of the road is not covered. Thus, the covered range can be identified by the information upload range.

Also, the vehicle 11 includes position and quality information of an observable white line, for example information indicating occurrence of degradation of the white line and an image of degraded white line, into the difference information. Note that the image may be transmitted in response to a request from the local server 122. As described above, the information administrator can utilize the position and quality information of the observable white line in the road management, by sending the position and quality information of the observable white line to the local server 122.

Also, the vehicle 11 includes, into the difference information, the information indicating the presence or absence of occurrence of erroneous detection factors, such as crack, dropped object, taint of oil, freeze, and rut by deposited snow, for example. Also, the vehicle 11 includes, in the difference information, the information indicating occurrence of boundary fluctuation factors including the white line, such as boundary change by interim construction work, circumvention change in accident handling, for example. Further, the vehicle 11 includes, in the difference information, occurrence of coming-over traveling of the oncoming vehicle to the current lane due to illegal parking at the oncoming vehicle side, flood information, accident information, neighborhood fire information, low visibility information, strong wind occurrence information at bridge, occurrence announcement of traveling disturbing neighboring accident, deceleration to following vehicle, slowing down recommendation information, for example. Note that the vehicle 11 may be configured to include other information indicating the traveling environment into the difference information, and to include one of the above information.

The vehicle 11 announces, as the information of the section, only the version information of the map data and the fact that there is no difference information, if there is no difference between the occurring event and the map data. Also, the information update is performed periodically for each certain section, and the update is performed immediately if the occurring event is an accident report of a high degree of urgency or the like. For example, urgent information such as a dropped object report and an accident report is uploaded immediately. Also, the local server 122 performs broadcast transmission of the urgent information, regardless of presence or absence of an information request from the vehicle in the neighboring area.

Here, specific examples of the information of a high degree of urgency are:
   occurrence of recognition and traveling difficult situation of the automatic driving due to occurrence of an accident
   occurrence of course interference due to a disabled vehicle occurrence of rapid taint, damage, recognition degradation factor of a road marker and a lane marker relevant to an automatic driving traveling lane, coming-in of normal vehicle to an automatic driving lane due to an influence of occurrence of an accident in a neighboring lane or the like rapid environment change due to weather, disaster, and the like occurrence of work that is not predicted by construction work schedule or the like.

<2. With Respect to Vehicle Control Device>

The vehicle that utilizes the traveling environment information supplied by the traffic information supplying system has a traveling control function for executing a traveling control by acquiring the traveling environment information from the information management center, as described above. Also, the vehicle has a difference information generating and sending function for generating the difference information indicating the difference between the traveling environment indicated by the acquired traveling environment information and the traveling environment acquired while traveling and supplying the generated difference information to the information management center. Next, a vehicle control device that is provided in the vehicle to perform the traveling control based on the traveling environment information and to generate and send the difference information will be described. Note that the vehicle control device may be configured to perform only one of the traveling control function and the difference information generating and sending function.

<2-1. Configuration of Vehicle Control Device>

FIG. 7 illustrates the configuration of the vehicle control device. The vehicle control device 20 includes a traveling environment acquiring unit 30, and a driving supporting unit 60. Also, the vehicle control device 20 is provided with a communication unit 41, a setting and control operation unit 42, a manual driving operation unit 43, a display unit 44, an actuator unit 45, and an information storage unit 46.

The traveling environment acquiring unit 30 acquires the surrounding traveling environment information of the host vehicle provided with the vehicle control device 20, while traveling. The traveling environment acquiring unit 30 includes an imaging unit 31, a sound acquiring unit 32, a radar unit 33, a position and traffic information acquiring unit 34, for example.

The imaging unit 31 is configured with a camera of one type or a plurality of types such as a single body camera, a stereo camera, and a TOF (Time Of Flight) camera. The single body camera generates a captured image from one viewpoint. The stereo camera can generate captured images from a plurality of viewpoints to calculate a distance to a subject on the basis of the captured images from the plurality of viewpoints. The TOF camera can measure the distance on the basis of reflected light delay of a pulse light and a modulated light. The imaging unit 31 associates the captured image generated by the camera with the surrounding traveling environment information data, and outputs the captured image to the driving supporting unit 60.

The sound acquiring unit 32 is configured with a microphone. The sound acquiring unit 32 outputs circumference sound of the host vehicle to the driving supporting unit 60 as the surrounding traveling environment information.

The radar unit 33 is configured with a RADAR or a LIDAR (Light Detection and Ranging). The radar unit 33 radiates a radio wave or a light, and measures a reflected wave or a reflected light from an object positioned before and after the host vehicle for example, and outputs an analysis result to the driving supporting unit 60 as the surrounding traveling environment information.

The position and traffic information acquiring unit 34 performs positioning by receiving signals of a global positioning system (Global Navigation Satellite System or GNSS). Also, the position and traffic information acquiring unit 34 receives a beacon signal indicating road traffic information, for example. The position and traffic information acquiring unit 34 outputs the positioning result, the received road traffic information, and the like, to the driving supporting unit 60 as the surrounding traveling environment information.

The communication unit 41 performs communication with the local server 122 of the information management center 12 via the wireless communication network such as DSRC (registered trademark) (Dedicated Short Range Communication), and outputs the received information to the driving supporting unit 60. Also, the communication unit 41 uploads, to the local server 122, the difference information generated by the driving supporting unit 60. Note that the communication unit 41 may perform communication with the information management center 12 via a wireless communication network such as a wireless communication network of wireless LAN and a wireless communication network for mobile phone such as 3G, LTE, and 4G.

The setting and control operation unit 42 is provided to enable a driver or the like to perform various types of setting operations and control operations to the vehicle. For example, in the setting and control operation unit 42, setting of a traveling route, a travel mode, and the like, and approval operation are performed. Also, in the setting and control operation unit 42, the control operation for disabling the vehicle braking sequence described later is performed. The setting and control operation unit 42 outputs, to the driving supporting unit 60, the operation signal according to operation of the driver or the like.

The manual driving operation unit 43 is operated by the driver when performing manual driving. The manual driving operation unit 43 is configured with a steering, an accelerator pedal, a brake pedal for example, and outputs an operation signal according to the operation of the driver to the driving supporting unit 60. Note that the manual driving operation is not limited to the driving operation by the manual transmission as described above, but is general driving operation which the driver intervenes in the driving operation.

The display unit 44 displays information relevant to a map, traveling guidance, a setting state and a control state of the vehicle, for example. Also, the display unit 44 displays various warnings to the driver.

The actuator unit 45 performs drive operation in the automatic driving or the manual driving. The actuator unit 45 is configured with a steering actuator, an accelerator actuator, a brake actuator, for example. The actuator unit 45 drives the steering, the accelerator, the brake, and the like, on the basis of the driving signal generated according to the automatic driving by the driving supporting unit 60, or the driving signal generated by the driving supporting unit 60 in response to the operation signal from the manual driving operation unit 43.

The information storage unit 46 stores the traveling environment information acquired from the information management center 12, for example the basic map data DE1, the updated basic map data DE1', the temporary change map data DE2, and the like.

The driving supporting unit 60 includes a traveling environment information processing unit 61 and a traveling control processing unit 62, for example.

The traveling environment information processing unit 61 searches for a traveling route, by using the following time traveling environment information acquired by the communication unit 41 and the traveling environment information acquired by the traveling environment acquiring unit 30. Also, the traveling environment information processing unit 61 detects the change of the specific time traveling environment information acquired by the communication unit 41 and the traveling environment indicated by the traveling environment information acquired by the traveling environment acquiring unit 30 with respect to the traveling environment indicated by the following time traveling environment information. The traveling environment information processing unit 61 transmits the difference information indicating the difference between the detected traveling environments, from the communication unit 41 to the local server 122.

The traveling control processing unit 62 generates the driving signal on the basis of the operation signal from the setting and control operation unit 42, various types of information stored in the information storage unit 46, the map data updated by the traveling environment information processing unit 61, and the like. The traveling control processing unit 62 executes the traveling control of the host vehicle on the traveling route searched for by the traveling environment information processing unit 61, by using the traveling environment information acquired by the traveling environment acquiring unit, the specific time traveling environment information acquired by the communication unit 41, and the following time traveling environment information. The traveling control processing unit 62 executes the automatic driving control to autonomously travel on the searched-for traveling route, by generating the driving signal on the basis of the traveling environment information and outputting the generated driving signal to the actuator unit 45. Also, the traveling control processing unit 62 executes the manual driving control by generating the driving signal on the basis of the operation signal from the manual driving operation unit 43 and outputting the generated driving signal to the actuator unit 45.

The driving supporting unit 60 may be configured with a central processing unit (CPU), a memory, and the like. In this case, the CPU of the driving supporting unit 60 executes various types of controls by using a driving control program and the traveling environment information stored in the memory.

<2-2. Operation of Vehicle Control Device>

The vehicle provided with the driving supporting unit is wirelessly connected to the information management center. If there is past traveling environment information (for example, the basic map data) of the traveling route accumulated in the information management center, the vehicle downloads the information and uses in the traveling environment recognition on the traveling scheduled route, when the vehicle travels on an unspecified traveling route. Also, the vehicle performs the autonomous automatic driving for example, by using the traveling environment information acquired from the information management center and the traveling environment information of a recognizable range acquired by the host vehicle. Further, the vehicle executes the active control of generating the difference information indicating the difference between the traveling environment information acquired from the information management center and the traveling environment information acquired by the host vehicle and uploading the generated difference information to the information management center, in order to perform the assist support in parallel with the autonomous automatic traveling or the manual driving.

Traveling is performed in the manual driving by the driver, when there is no advance traveling vehicle over several hours on the ordinary road, for example. Note that, for the purpose of ensuring traveling safety of itself, the host vehicle generates the difference information on the basis of the acquired traveling environment information of the recognizable range, and uploads the generated difference information to the information management center. The information management center supplies, to the vehicle that travels the corresponding section thereafter as a scheduled route, the update information which is the following time traveling environment information, by statistically amassing the uploaded difference information.

FIG. 8 is a flowchart illustrating the operation of the vehicle control device. In step ST11, the driving supporting unit of the vehicle control device executes a traveling route setting process. In the traveling route setting process, candidates of the traveling route to the destination place are presented to the driver for selection. The driving supporting unit decides the traveling route by utilizing the traveling environment information.

FIG. 9 is a flowchart illustrating the operation of the traveling route setting process. In step ST31, the driving supporting unit performs acceptance of the traveling route setting operation. The driving supporting unit accepts the setting operation of the initial route by the inputs of a departure place, a destination place, a stopover place, and the like of the driver, which are performed to the setting and control operation unit 42, and proceeds to step ST32.

In step ST32, the driving supporting unit confirms the traveling environment information. The driving supporting unit confirms the specific time traveling environment information acquired via the communication unit, and searches for a rough traveling route according to the setting operation of an initial route. In the search for the traveling route, the acquired basic map data DE1, the updated basic map data DE1', the temporary change map data DE2 are confirmed to acquire traveling route candidates information, automatic driving availability section information, traffic jam information, and the like, and the process proceeds to step ST33.

In step ST33, the driving supporting unit confirms the setting and announces consultation information. The driving supporting unit announces to the driver by displaying, on the display unit, the consultation information utilizable in the con-firmation of the setting operation of the initial route and decision of the traveling route, for example information such as the traveling route candidates information, the automatic driving availability section information, the traffic jam information.

In step ST34, the driving supporting unit acquires the following time traveling environment information. The driving supporting unit requests the following time traveling environment information to the local server, for example. Also, the driving supporting unit acquires the following time traveling environment information supplied from the local server in response to the request or the traveling environment information supplied by broadcasting from the local server, and proceeds to step ST35.

In step ST35, the driving supporting unit generates traveling route selection information. The driving supporting unit searches for the traveling route, by further using the traveling environment information acquired from the local server. The driving supporting unit searches for a traveling route where the automatic driving can be performed preferentially, the shortest traveling route where the automatic driving and the manual driving are mixed, the safest traveling route where the automatic driving and the manual driving are mixed, a traveling route excluding toll roads, for example. Also, the driving supporting unit searches for a traveling route of a high degree of reliability in the search of the traveling route, by utilizing the reliability degree information acquired from the information management center. The driving supporting unit generates the traveling route selection information indicating the search result, and proceeds to step ST36.

In step ST36, the driving supporting unit announces the traveling route selection information. The driving supporting unit announces the traveling route selection information indicating the search result of the traveling route which further uses the traveling environment information acquired from the local server, to the driver, by utilizing the display unit for example.

In step ST37, the driving supporting unit accepts a traveling route selection operation. The driving supporting unit decides the traveling route, by accepting the selection operation of the driver to a traveling route indicated by the traveling route selection information.

Note that the driving supporting unit may announce, in step ST36, the information that is announced in step ST33.

The driving supporting unit of the vehicle control device starts traveling in the traveling route decided in step ST11 of FIG. 8, and thereafter determines whether the following time traveling environment information is acquired in step ST12. The driving supporting unit proceeds to step ST13 if acquiring the following time traveling environment information of the traveling route, and proceeds to step ST15 if not acquiring the following time traveling environment information.

In step ST13, the driving supporting unit determines whether the autonomous automatic driving is enabled. The driving supporting unit determines whether the autonomous automatic driving is enabled, on the basis of the acquired traveling environment information, and proceeds to step ST14 if determining that the automatic driving is enabled, and proceeds to step ST17 if determining that the automatic driving is not enabled.

In step ST14, the driving supporting unit executes the automatic driving control. The driving supporting unit executes the traveling control to perform the autonomous automatic driving on the basis of the acquired traveling environment information and the traveling environment information acquired by the traveling environment acquiring unit. Also, the driving supporting unit generates the difference information indicating the difference between the traveling environment indicated by the acquired traveling environment information and the traveling environment when the traveling environment acquiring unit acquires the traveling environment information. The driving supporting unit uploads the generated difference information to the local server of the information administrator side for example, and proceeds to step ST19.

In step ST15, the driving supporting unit determines whether or not the manual priority driving is selected in the route where there is no automatic dedicated lane. The driving supporting unit proceeds to step ST17 if the manual priority driving is selected by the driver, and proceeds to step ST16 if the manual priority driving is not selected in advance.

In step ST16, the driving supporting unit determines whether there is a low speed traveling lane. The driving supporting unit determines whether there is a newest map information updated low speed traveling lane where the automatic driving of low speed traveling is enabled in the traveling route, on the basis of the latest traveling environment information. The driving supporting unit proceeds to step ST17 if there is no newest map information updated low speed traveling lane, and proceeds to step ST18 if there is the newest map information updated low speed traveling route where the automatic driving is enabled.

In step ST17, the driving supporting unit executes the manual driving control. The driving supporting unit drives the actuator unit on the basis of the driving operation of the driver in the manual driving operation unit, in order to execute the traveling control in such a manner that the vehicle travels in response to the driving operation. Also, the driving supporting unit acquires the traveling environment information by the traveling environment acquiring unit. Further, the driving supporting unit generates the difference information indicating the difference between the traveling environment indicated by the acquired traveling environment information and the traveling environment that the traveling environment acquiring unit acquires the traveling environment information, and uploads the generated difference information to the local server of the information administrator side for example, and proceeds to step ST19. Here, the host vehicle updates to the latest environment information while traveling the corresponding route, so that the following vehicle can keep the sufficient degree of reliability unless the interval is less than a certain period, and the thus automatic driving is enabled according to the safety degree. Also, the driving supporting unit uploads the difference information, in order to expand the map information as in FIG. 11 described later.

In step ST18, the driving supporting unit executes a low speed automatic driving control. The driving supporting unit executes the traveling control to travel at a low speed automatically in the low speed traveling lane. Also, the driving supporting unit acquires the traveling environment information by the traveling environment acquiring unit. Further, the driving supporting unit generates the difference information indicating the difference between the traveling environment indicated by the acquired traveling environment information and the traveling environment that the traveling environment acquiring unit acquires the traveling environment information, and uploads the generated difference information to the local server of the information administrator side for example, and proceeds to step ST19.

In step ST19, the driving supporting unit executes a traveling route changing process, and sets the next traveling route, during normal traveling. The driving supporting unit determines whether circumvention or the like is to be performed, on the basis of the acquired following time traveling environment information and the traveling environment information acquired by the traveling environment acquiring unit. After start traveling along the traveling route, the driving supporting unit travels while acquiring in advance the traveling environment information of the corresponding traveling scheduled route, for each certain section of the scheduled route section, for example by the unit of several hundred to several thousand meters. When the acquired traveling environment information indicates a trouble such as occurrence of an accident and deterioration of the traveling environment for example, the driving supporting unit changes the traveling route in such a manner to avoid the trouble, and uploads the information of the detected trouble to the local server, and proceeds to step ST20.

In step ST20, the driving supporting unit determines whether to end the driving. The driving supporting unit returns to step ST12 if the driving is not ended, and again performs the control determination in the next route. Also, the driving supporting unit ends the operation if determining that the driving is ended.

The driving supporting unit executes the search of the traveling route and the driving control by this process. Further, the driving control unit uploads the difference information in the traveling zone where the automatic driving special lane is not provided, so that the road management is performed appropriately and the traveling environment information is updated within a past limited period in order to supply information sufficient for the driving traveling support from the server as appropriate, thereby enabling the following vehicle to perform the automatic driving.

Next, in the operation of the vehicle control device, acquisition and update of the traveling environment information will be described in detail. FIG. 10 is a flowchart illustrating the process relevant to the acquisition and the update of the traveling environment information. In step ST41, the driving supporting unit of the vehicle control device determines whether the areal broadcast signal is received. The driving supporting unit determines whether the communication unit has received the broadcast signal from the local server provided by the information administrator, for each area. The driving supporting unit proceeds to step ST42 if the broadcast signal is not received, and proceeds to step ST47 if the broadcast signal is received.

In step ST42, the driving supporting unit transmits an information request signal. The driving supporting unit transmits to the local server the information request signal for requesting the traveling environment information relevant to the traveling scheduled route of the host vehicle, and proceeds to step ST43.

In step ST43, the driving supporting unit acquires the following time traveling environment information. The local server performs statistical analysis by sequentially accumulating the received difference information, and generates update information $Ps(t)$ indicating the difference of the traveling environment relative to the basic map data and the temporary change map data, and reliability degree information $Fs(t)$ indicating the degree of reliability of the traveling environment information. The update information $Ps(t)$ and the reliability degree information $Fs(t)$ is multidimensional information generated in a format that is unified in advance. Also, when receiving the information request signal, the local server transmits a broadcast signal indicating the update information $Ps(t)$ and the reliability degree information $Fs(t)$ generated on the basis of the information up to the time point when receiving the request signal. The driving supporting unit acquires the update information $Ps(t)$ and the reliability degree information $Fs(t)$ as the following time traveling environment information, by receiving the broadcast signal transmitted from the local server, and proceeds to step ST44.

In step ST44, the driving supporting unit performs calculation of an update delay determination criterion of the traveling environment information. When the traveling control of the vehicle is performed, the upper limit traveling speed, the braking distance, the adequate inter-vehicle distance, and the like changes depending on the change of the friction coefficient of the road at the moments (for example, change of friction coefficient, due to rain, snow, freeze, deposition of sand, etc.), crosswind, in-clination situation of the road, vicinity construction work, accomplishment of the work, etc. Also, weather environment that changes the observable distance on the road (for example, rain, fog, snowfall, etc.), delay situation until recognition completeness by the observation affect the changes. Hence, an allowable delay time of the advance information of the forward traveling road that is used in autonomous traveling does not change in a uniform way. Thus, as the elapsed time from the generation of the traveling environment information becomes longer, the driving supporting unit executes the traveling control according to the degree of reliability of the following time traveling environment information, because the degree of reliability of the following time traveling environment information decreases.

Here, it is supposed that the update information $Ps(td2)$ and the reliability degree information $Fs(td2)$ generated by using the difference information obtained from the vehicle that travels within a past time $Td2$ that is sufficiently close to the current time point (for example, within approximately last several ten minutes) have a high reliability. Also, if it is not a past time that is much longer than the past time $Td2$, the autonomous automatic driving is performed safely with the information that is delayed within a past time $Td1$ (for example, within approximately last one hour to two hours) by reducing the upper limit traveling speed at the time of the control. However, when the map data saved in the autonomous traveling vehicle is very old, it is possible that the current road environment is changed significantly from the road environment indicated by the saved map data, and the saved map data is not appropriate for the map data that is referred in the autonomous traveling.

Also, for example, in the traveling zone of the below ideal environment,
   the road boundary of the corresponding section is a white line, and there is not paint degradation
   the road environment of the corresponding section has no erroneous detection factor of the white line
   a weather recognition degradation factor is not present at the corresponding time point (rainfall 0%, snowfall 0%, . . . )
   there is no temporal recognition degradation factor (influence of backlight, shadow of adjacent environment, etc.)
   there is no dropped object information and no construction work information
   simple straight road section The past time $Td1$ may be set to a sufficiently long time, and even if the past time $Td2$ is set to one to two hours or approximately half a day for example, a big problem does not occur.

Also, for example, when deposited snow makes it difficult to distinguish the road white line from a forward traveling vehicle rut, an allowable past time is shortened. The autonomous automatic driving can be continued, if the vehicle control is optimized simultaneously as appropriate by setting a longer vehicle braking distance to reduce the traveling maximum speed limit, by expediting the brake control, and by setting the adequate inter-vehicle distance at a longer distance than normal time. Note that, when the traveling environment information of a certain interval or more before is unable to be acquired depending on the situation, the automatic driving is unable to be performed at a certain constant speed or more, and thus it is desirable that the minimum update interval of the traveling environment information is set according to the traveling environment situation as the past time $Td1$.

Thus, the driving supporting unit calculates the past times $Td1$, $Td2$ according to the traveling environment situation, as the update delay determination criterion of the following time traveling environment information, and proceeds to step ST45.

In step ST45, the driving supporting unit executes a restriction determination process. The driving supporting unit executes the restriction determination process, to execute the traveling control by increasing the number of restrictions relevant to the traveling as the elapsed time from the generation of the following time traveling environment information becomes longer and the degree of reliability decreases. In the restriction determination process, the driving supporting unit compares, with the past times Td1, Td2, the temporal difference Tw between the time point indicated by the time point tag and the current time point, by utilizing the time point tag of the acquired latest update information. Here, if the temporal difference Tw is equal to or longer than the past time Td2 and shorter than the past time Td1, the process proceeds to step ST46. Also, the process proceeds to step ST48 if the temporal difference Tw is shorter than the past time Td2 and the traveling environment acquiring unit acquires information of a high degree of reliability, and the process proceeds to step ST54 if the temporal difference Tw is equal to or longer than the past time Td1. Also, the driving supporting unit may include a reliability degree curve that indicates the degree of reliability for the elapsed time since the advance information is acquired. For example, when the degree of reliability is plotted on the vertical axis, and the elapsed time since the advance information is acquired is plotted on the horizontal axis, the reliability degree curve is represented by a function of monotone decreasing. Further, a plurality of reliability degree curves may be provided, and for example the reliability degree curve at the time of snowing weather is set steeper than the reliability degree curve at the time of fine weather.

In step ST46, the driving supporting unit sets restricted traveling. In the driving supporting unit, when the temporal difference Tw is equal to or longer than the past time Td2 and shorter than the past time Td1, the acquired update information is information of a high degree of reliability, but is also information whose degree of reliability can decrease due to the change of the weather situation such as snowing for example. Thus, the driving supporting unit performs the restriction of the traveling speed for example, and performs setting to travel at a lower speed than the legal maximum speed in response to the acquired information. Also, the driving supporting unit increases the number of restrictions relevant to traveling, as the degree of reliability decreases. The driving supporting unit executes this process to increase safety, and proceeds to step ST49. Note that, in the restricted traveling, a braking safety coefficient is increased to enable the vehicle to slow down or stop immediately.

If the process proceeds from step ST41 to step ST47, the driving supporting unit extracts information from the broadcast signal. The driving supporting unit extracts the update information Ps(t) and the reliability degree information Fs(t) relevant to the traveling route of the host vehicle, as the information, from the broadcast signal, and proceeds to step ST48.

In step ST48, the driving supporting unit sets normal traveling. In the driving supporting unit, the acquired information is information of a high degree of reliability, when the temporal difference Tw from the update information obtained by receiving the areal broadcast signal is shorter than the past time Td2. Also, the traveling environment acquiring unit acquires the traveling environment information. Thus, the driving supporting unit sets the normal traveling in order to travel within a legal speed in response to the update information acquired via the communication unit and the traveling environment information acquired by the traveling environment acquiring unit, and proceeds to step ST49.

In step ST49, the driving supporting unit performs the recognition of the forward region and the acquisition of the traveling environment information. The driving supporting unit autonomously performs the recognition of the forward region immediately before traveling, on the basis of the update information Ps(t), the reliability degree information Fs(t), the signals of the global positioning system, and the like. Also, the driving supporting unit acquires the traveling environment information and the observable data indicating the road situation, the surrounding obstacle, and the like while traveling, and proceeds to step ST50.

In step ST50, the driving supporting unit executes the traveling control in response to the acquired information. The driving supporting unit performs the autonomous traveling control calculation on the basis of the recognition result of the forward region and the traveling environment information, and executes the traveling control of the vehicle by generating the driving signal on the basis of the calculation result and outputting the generated driving signal to the actuator unit, and proceeds to step ST51.

In step ST51, the driving supporting unit performs upload preparation of the difference information. The driving supporting unit calculates the differences between the traveling environment information and the reliability degree information obtained by autonomously recognizing at the already passed section and the update information Ps(t) and the reliability degree information Fs(t) acquired before traveling for the already passed section. If the difference is a threshold value or more, the driving supporting unit sets the information indicating the difference as the difference information that is uploaded to the local server, and proceeds to step ST52.

In step ST52, the driving supporting unit executes the upload process. The driving supporting unit uploads the difference information to the local server. Also, the driving supporting unit monitors the communication traffic with the local server, and uploads the difference information in the order from high degree of importance at the time of high traffic, or in the order of request from the local server, and proceeds to step ST53. Note that the upload may be performed in a timely manner or periodically.

Also, in the route of low traveling frequency, the traveling environment information tends to be insufficient, and there is a risk that sufficient traveling environment information for the autonomous traveling is not passed to the following vehicle. Thus, it is desirable that the difference information is not basically culled but always uploaded. Further, the communication traffic becomes too heavy when all vehicles repeat the upload of the difference information in the route of high traveling frequency, generating the risk of delayed update of important information. Hence, for example, the vehicle individually performs the autonomous upload of the difference information of urgent content, and uploads the difference information of non-urgent content based on the request from the server, in order to prevent the occurrence of the risk of too heavy communication traffic and update delay of important information.

The difference information of the urgent content is, for example:

1. Rapid degradation information of traveling environment, such as accident occurrence information, sudden change of weather, accident road surface taint, etc.

2. intrusion to a dedicated road of a walker, etc.

3. difference information indicating depression, rockfall, and snow avalanche immediately in front of a road, for example the difference information indicating wear-out of a white line, regular taint, and the like, is detectable steadily in a plurality of preceding vehicles, and is not urgent, and therefore is set as the difference information of non-urgent content.

In step ST53, the driving supporting unit discards unnecessary information. The traveling environment information and the reliability degree information obtained by autonomously recognizing at the already passed section are uploaded when the difference is equal to or larger than a threshold value, in order to be made utilizable in the following vehicle. Also, the traveling environment information and the reliability degree information obtained by autonomously recognizing at the already passed section is the unnecessary information in the traveling control of the subsequent traveling zone. Thus, the driving supporting unit discards, as unnecessary information, the traveling environment information and the reliability degree information obtained by autonomously recognizing at the already passed section, and returns to step ST41.

If the process proceeds from step ST45 to step ST54, the driving supporting unit outputs an alert relevant to the traveling support. When the temporal difference Tw is equal to or longer than the past time Td1 in the driving supporting unit, the acquired update information is the information of a low degree of reliability as compared with when the temporal difference Tw is shorter than the past time Td1. Thus, the driving supporting unit outputs, to the driver, an alert of halt or end of the traveling support according to the acquired information, and proceeds to step ST55.

In step ST55, the driving supporting unit monitors the acquisition of the following time traveling environment information. The driving supporting unit periodically monitors whether the following time traveling environment information can be acquired from the local server along the traveling route, and proceeds to step ST56.

In step ST56, the driving supporting unit determines whether an access point is detected. The driving supporting unit periodically monitors the acquisition of the following time traveling environment information, and returns to step ST41 if detecting the access point for acquiring the following time traveling environment information from the local server, and returns to step ST55 if not detecting the access point.

As described above, safer traveling is enabled, by performing the restriction control, for example the control for restricting the upper limit speed at the time of traveling, according to the traveling environment information, the degree of reliability of the traveling environment information, and the reliability degree factor of the traveling environment acquired at the time of traveling. Generally, when traveling in the situation of a low reliability of the traveling environment information acquired at the time of the traveling environment recognition, traveling in the automatic driving results in low speed traveling, but in that case, it is envisaged that the driver decides to travel within the legal speed by manual driving. During that, the host vehicle uploads the difference information to the information management center. The information management center statistically amasses the uploaded difference information, and generates the update information of a high degree of reliability, and provides the generated update information to the following vehicle, so that the following vehicle can perform the autonomous automatic traveling by utilizing the traveling environment information of an improved degree of reliability. Also, the supply area of the traveling environment information can be easily enlarged by the traveling of the vehicle, as illustrated in FIG. 11, by utilizing the uploaded information. FIG. 11 (*a*) illustrates, with hatching, the supply area of the traveling environment information in YY year MA month D1 day, in the corresponding region of the local server 122, for example. Here, when communication is performed between the local server 122 and the vehicle that travels the area where the traveling environment information is not supplied, the traveling environment information is uploaded as the difference information from the vehicle that travels the area where the traveling environment information is not supplied. The local server 122 generates the update information of a high degree of reliability by statistically amassing the uploaded difference information, and supplies the generated update information to the following vehicle. Thus, for example, in YY year MB month D2 day after YY year MA month D1 day, the supply area of the traveling environment information can be expanded, as illustrated in FIG. 11 (*b*). Also, the master server 121 can easily perform the version upgrade of the basic map data DE1, by utilizing the difference information uploaded in the local server 122, for example.

Also, even when the lane is not the autonomous traveling special lane, the traveling environment information is supplied to enable the autonomous automatic driving, when the vehicle starts traveling from a time period when many vehicles provided with the traveling environment information processing unit are traveling, unless the road environment lacks lane information or the like. Also, when such operation always continues without interruption, the road management side can detect a problem on the route which decreases the degree of reliability, in order to perform prioritized im-provement. Thus, as a result, the managed route is expected to have a moderate utilization frequency, and therefore the traveling environment information appropriate for the autonomous automatic driving can be provided.

Also, in the situation where the broadcast information is not obtained, the information is transmitted to and received from the local server on the basis of the request. Here, the transmission and reception information is the difference information indicating the difference from the map data whose version is managed, and the update information which is the update part, in order to prevent too much traffic of the communication network by individual vehicles.

Further, the automatic upload function of the difference information is spread to many vehicles, in order to supply the following time traveling environment information of a high reliability, and to improve the safety performance of the traveling vehicle. Thus, provision of the automatic upload function of the difference information can be promoted, by introducing a preferential system of tax system and insurance for example to the vehicle provided with the vehicle control device such as the present technology.

<2-3. Case of Upload of Difference Information>

Next, a case of upload of the difference information will be described. When a traveling vehicle recognizes the traveling environment, there are many objects that are difficult to detect in the actual recognition or are unable to perform a correct determination without extremely advanced detection. Hence, the device becomes expensive to make the recognition of the vehicle control device highly accurate and its prevalence is prevented, and therefore it is appropriate to keep the recognition at a certain level actually, and to the change the control or compensate the recognition result, depending on the situation, when the recognition is difficult.

FIG. 12 is a diagram for describing a case of upload of the difference information. As illustrated in FIG. 12 (a), for example, even if a white line mark is broken by aging degradation at a part of a road, and it is difficult to detect the straight line component of the white line mark, the observation of the part of the straight line is assumed from the continuity of the mark before and after the broken part. Also, as illustrated in FIG. 12 (b), in the same way, it is assumed that a broken mark is observed in a situation deposited snow and rut are mixed. In this case, as illustrated in FIG. 12 (c), the acquired traveling environment information indicates that the traveling zone is a section where the degradation of the white line mark has not occurred, it is determined that the reliability of the autonomous recognition result is low, and that an erroneously recognized line segment is highly probable due to the deposited snow, the rut, or the like. Thus, when decrease of recognition reliability is assumed, a control change, such as reducing the traveling speed limit of the host vehicle and increasing the inter-vehicle distance to the forward vehicle while traveling, is performed in order to keep the safety level at a desired level while traveling.

<2-4. Case in which Traveling Environment Information is to be Supplied, Prior to Traveling Zone>

Next, a case in which the traveling environment information is to be supplied, prior to the traveling zone will be described. The determination of whether to be able to travel the road is performed on the basis of a captured image of a camera installed at a height of approximately 1.5 meter, and a forward traveling environment acquired on the basis of the measurement result of a laser radar installed at a height of approximately 50 cm or more at least, for example. Also, the acquisition of the forward traveling environment is limited by the up-down gradient of the road.

FIG. 13 illustrates a case in which the acquisition of the forward traveling environment is limited by the up-down gradient of the road. For example, when the traveling environment is recognized on the basis of the captured image of the imaging unit installed at the height of 1.5 m in the host vehicle, at 50 m ahead the road is inclined in the downward direction by a tan(1.5/50) in the downward direction from the traveling horizontal angle of the host vehicle. In this case, the shape over there below the road gradient of a tan(1.5/50) is unable to be recognized at all. Also, as in FIG. 14, when the road curves, it is difficult to autonomously recognize the forward traveling environment due to an obstacle OB, in the same way. However, data for supporting the smooth traveling can be supplied, by including the road situation of the unobservable region that is not autonomously recognized, in the traveling environment information acquired before traveling. For example, in the section where the road and the surrounding structure information are the extension of the straight road and the occurrence risk of an obstacle is low, a large traveling problem does not occur even if there is a temporary unobservable section. However, in an up-down section, a curve section, or the like, recognition intermission may cause an accident. Hence, in the unobservable region, speed reduction, which is a restriction unique to the automatic driving, is performed by deceleration traveling, in order to prevent an accident in the traveling control of the vehicle despite the braking delay that occurs in the control when the vehicle is close to the observable section.

For example, in FIG. 13, a traveling zone ZA1 is the traveling zone where an unobservable region UA is generated, and the traveling zone ZA2 is the traveling zone where the recognition of the unobservable region UA is difficult, and the traveling zone ZA3 is the traveling zone where that does not generate the unobservable region UA. Note that an observation region UB is the section where the tangent line angle of the range captured by the imaging unit does not change so much, and in this section the vertical position does not change so much on the captured image and the recognition is difficult. Here, in the traveling control of the traveling zone ZA1 that generates the unobservable region UA on the basis of the traveling environment information, the traveling speed is restricted to immediately stop the vehicle in case a trouble occurs in the unobservable region UA, when going into the unobservable region UA. Also, in FIG. 14, the traveling zone ZB1 is the section that does not keep the forward distance MLV (Minimum Longitudinal Visibility) because of the obstacle OB. Here, in the traveling control of the traveling zone ZB1 that does not keep the forward distance MLV on the basis of the traveling environment information, the traveling speed is restricted to immediately stop the vehicle even if there is a trouble in the forward direction.

Further, when the vehicle performs the braking on the basis of the recognition result of the traveling environment, the deceleration traveling is performed to compensate for a distance Sd corresponding to an estimated braking delay associated with a delay time Td, when the delay time Td is generated as illustrated in FIG. 15. Note that, FIG. 15 (a) illustrates a case in which the delay time is not generated, and FIG. 15 (b) illustrates a case in which the delay time is generated.

<2-5. Another Operation of Vehicle Control Device>

Next, another operation of the vehicle control device will be described by using FIGS. 16, 17. In step ST61 of FIG. 16, the driving supporting unit of the vehicle control device executes a traveling route semi-automatic update process. The driving supporting unit updates the traveling route to the destination place on the basis of the basic map data DE1, the updated basic map data DE1', the temporary change map data DE2, and the update information Ps, and proceeds to step ST62.

In step ST62, the driving supporting unit transmits an information request signal. The driving supporting unit transmits to the local server the information request signal for requesting the following time traveling environment information relevant to the traveling scheduled route of the host vehicle, and proceeds to step ST63.

In step ST63, the driving supporting unit receives a reply signal. The driving supporting unit receives the reply signal replying to the information request signal, from the local server, and proceeds to step ST64.

In step ST64, the driving supporting unit determines whether the update information is included in the reply signal. The driving supporting unit proceeds to step ST65 if the update information Ps(t) and the reliability degree information Fs(t) are included in the reply signal, and proceeds to step ST81 of FIG. 17 if the update information is not included.

In step ST65, the driving supporting unit performs the calculation of the update delay determination criterion of the traveling environment information. The driving supporting unit calculates the past times Td1, Td2 according to the traveling environment situation, as the update delay determination criterion of the following time traveling environment information, and proceeds to step ST66.

In step ST66, the driving supporting unit executes the restriction determination process. The driving supporting unit compares, with the past times Td1, Td2, the temporal difference Tw between the time point indicated by the time point tag and the current time point, by utilizing the time point tag of the acquired latest update information. Here, if the temporal difference Tw is equal to or longer than the past time Td2 and is shorter than the past time Td1, the process proceeds to step ST67. Also, the process proceeds to step ST68 if the temporal difference Tw is shorter than the past time Td2 and the following time traveling environment information of a high degree of reliability is acquired, and the process proceeds to step ST81 if the temporal difference Tw is equal to or longer than the past time Td1.

In step ST67, the driving supporting unit sets restricted traveling. In the driving supporting unit, when the temporal difference Tw is equal to or longer than the past time Td2 and shorter than the past time Td1, the acquired update information is information of a high degree of reliability, but is also information whose degree of reliability can decrease. Thus, the driving supporting unit performs the restriction of the traveling speed for example, and performs setting to travel at a lower speed than the legal maximum speed in response to the acquired information to increase safety, and proceeds to step ST69.

In step ST68, the driving supporting unit sets normal traveling. In the driving supporting unit, the acquired update information is information of a high degree of reliability, when the temporal difference Tw is shorter than the past time Td2. Thus, the driving supporting unit sets the normal traveling in order to travel within a legal speed in response to the update information acquired via the communication unit and the traveling environment information acquired by the traveling environment acquiring unit, and proceeds to step ST69.

In step ST69, the driving supporting unit determines whether there is the environment recognition degradation factor. The driving supporting unit determines that there is the environment recognition degradation factor if the factor that degrades the recognition of the traveling environment as compared with the traveling environment indicated by the basic map data is included in the update information and the reliability degree information, and proceeds to step ST70. Also, the driving supporting unit determines that there is no environment recognition degradation factor if the factor that degrades the recognition of the traveling environment is not included in the update information and the reliability degree information, and proceeds to step ST74.

In step ST70, the driving supporting unit executes a calibration process. The driving supporting unit executes the calibration process to the factor that degrades the recognition of the traveling environment in the offset information and the following time traveling environment information acquired by the traveling environment acquiring unit, for example. For example, when the aging degradation of the marker occurs, the determination criterion of the marker is adjusted to recognize the marker having the aging degradation.

Also, the driving supporting unit may execute the calibration process by utilizing the weather condition, the traveling time point, and the like. For example, when a head light of an oncoming vehicle reflects on the road surface at the time of rainy weather, the image captured by the front camera includes not only the head light from the oncoming vehicle but also the light reflected on the road surface, and has a different picture from the image at the time of normal fine weather. Thus, in the case of the rainy weather, the light that forms a pair with the light from the head light main body is determined to be the reflected light from the road surface, and the light from the head light main body is intensively recognized, and the road surface reflected light is masked assuming that the normal road surface and the lane marker exist, or image processing such as superimposing an imaginary lane marker is performed. Also, when there are taint such as oil and deposition of sand on the lane marker of the road surface, the image captured by the front camera is different, at a time point of a low sun elevation angle in the morning and evening, as compared with a time point of normal daytime. In this case, a low elevation angle incoming light is determined, and an appropriate image processing is performed to the image of the lane marker where the taint such as oil and the deposition of sand exist. As described above, when the calibration process is performed for the event that occurs in a specific weather condition and the event that occurs at a specific time point, the traveling environment can be recognized by reducing the influence by the weather condition, the traveling time point, and the like. The driving supporting unit performs the calibration process as described above, and proceeds to step ST71.

In step ST71, the driving supporting unit determines whether a high reliability can be maintained. If the driving supporting unit determines that a high reliability can be maintained by executing the calibration process in the recognition of the traveling environment, the process proceeds to step ST73. Also, if the driving supporting unit does not determine that a high reliability can be maintained, for example if there is a risk to generate detection delay due to the degradation of the marker or the like, the process proceeds to step ST72.

In step ST72, the driving supporting unit performs speed limitation. The driving supporting unit restricts the maximum speed of the vehicle in response to the factor that decreases the reliability, and proceeds to step ST73. Also, the driving supporting unit generates the difference information that is uploaded to the local server on the basis of the traveling environment information acquired by the host vehicle and the reliability degree information described by using the above table 3 to table 6. Also, the local server performs a process for statistically amassing the uploaded difference information, and generates the update information indicating the following time change, and supplies the update information to the following vehicle that enters into the information supply area. Thus, the following vehicle executes a combined determination process by using the traveling environment information and the degree of reliability included in the update information acquired from the local server and the traveling environment information acquired by the traveling environment acquiring unit, and executes the traveling control on the basis of the processing result, in order to achieve safe traveling.

In step ST73, the driving supporting unit acquires the lane recognition and the traveling environment information. The driving supporting unit executes the autonomous sensing and the calibration process, and acquires the lane recognition and the traveling environment information, and proceeds to step ST76.

In step ST74, the driving supporting unit keeps the forward view field. For example, when the inter-vehicle distance from the forward traveling vehicle is short and the forward view angle is smaller than a threshold value, the driving supporting unit increases the inter-vehicle distance to keep the forward view field to perform the lane identification, and proceeds to step ST75.

In step ST75, the driving supporting unit acquires the lane recognition and the traveling environment information. The driving supporting unit executes the autonomous sensing, and acquires the lane recognition and the traveling environment information, and proceeds to step ST76.

In step ST76, the driving supporting unit determines whether there is an unexpected trouble. The driving supporting unit determines whether the traveling environment information acquired by the traveling environment acquiring unit does not include the unexpected trouble that is not indicated by the specific time traveling environment information or the following time traveling environment information acquired via the communication unit. The driving supporting unit proceeds to step ST80 if the unexpected trouble is not detected, and proceeds to step ST77 if the unexpected trouble is detected.

In step ST77, the driving supporting unit executes a trouble handling control. The driving supporting unit executes the traveling control for avoiding a trouble. Also, the driving supporting unit executes the traveling control for minimizing the collision relative speed, when it is difficult to avoid the trouble. Note that the driving supporting unit may perform ranking of objects of trouble, and execute a weighted control the collision relative speed in response to a collision prediction time (TTC: Time To Collision) of each ranking. The driving supporting unit executes the trouble handling control, and proceeds to step ST78.

In step ST78, the driving supporting unit determines the control result. If the driving supporting unit determines a normal avoidance range within which it is possible to avoid the trouble by a normal avoidance operation, the process proceeds to step ST80. Also, if the driving supporting unit determines an incident level in which it is possible to avoid the trouble by an operation of a higher urgency degree than the normal avoidance operation, the process proceeds to step ST79. Further, if the driving supporting unit determines an urgent vehicle stopping level in which it is not possible to avoid the trouble, the process proceeds to step ST86 of FIG. 17.

In step ST79, the driving supporting unit executes an incident process. As an accident did not occur but there was a danger of accident, the driving supporting unit records and/or announces to the information administrator side the information of the object of the trouble and the information relevant to the avoidance operation as the incident information, and proceeds to step ST80. Note that the information of the object of the unexpected trouble and the information relevant to the avoidance operation is not necessarily announced to the information administrator side in response to the detection of the unexpected trouble, but may be announced periodically, and may be announced to the information administrator side in response to an request from the server.

In step ST80, the driving supporting unit executes the traveling control. The driving supporting unit executes the traveling control in accordance with the traffic rule, on the basis of the acquired map data and the traveling environment information acquired by the traveling environment acquiring unit. Also, the driving supporting unit executes the traveling control by keeping an appropriate inter-vehicle distance, when traveling following the forward vehicle. The driving supporting unit executes a normal traveling control, and returns to step ST62.

If the process proceeds from step ST64 or step ST66 to step ST81 of FIG. 17, the driving supporting unit searches for a traveling route. The driving supporting unit searches for another route to acquire the following time traveling environment information for the autonomous traveling, and proceeds to step ST82.

In step ST82, the driving supporting unit determines whether there is a traveling route for which the update information is acquired. The driving supporting unit proceeds to step ST83 if there is a traveling route for which the update information is acquired, and proceeds to step ST86 if not.

In step ST83, the driving supporting unit performs a traveling continuation selection announcement. The driving supporting unit announces to the driver by using sound or display whether to continue traveling in the other route by the autonomous automatic driving or to continue traveling in the original traveling route by switching to manual driving, and proceeds to step ST84.

In step ST84, the driving supporting unit determines whether to continue the automatic driving in the other route. The driving supporting unit proceeds to step ST85 if the continuation of the traveling by the automatic driving in the other route is selected, and proceeds to step ST86 if the continuation of the traveling by the manual driving in the original traveling route is selected.

In step ST85, the driving supporting unit changes the traveling route. The driving supporting unit sets the other route where the traveling by the automatic driving is enabled as a new traveling route, and returns to step ST62 of FIG. 16.

If the process proceeds from steps ST78, 82, 84 to step ST86, the driving supporting unit performs manual driving switching preparation. The driving supporting unit determines a driving takeover performance as the manual driving switching preparation. In the determination of the driving takeover performance, it is determined whether the manual driving is enabled, on the basis of the wakefulness state of the driver, the authentication result of the driver, and the like, for example, and proceeds to step ST87.

In step ST87, the driving supporting unit determines whether the driving takeover is enabled. The driving supporting unit proceeds to step ST88 if determining that the manual driving is enabled, and proceeds to step ST89 if determining that the manual driving is not enabled.

In step ST88, the driving supporting unit switches to the manual traveling mode. The driving supporting unit switches to the manual traveling mode, and drives the actuator unit in response to the operation of the manual driving operation unit to perform the manual traveling.

In step ST89, the driving supporting unit executes an urgent vehicle stopping process. The driving supporting unit executes the urgent vehicle stopping process, because the manual driving is not enabled. The urgent vehicle stopping process executes a process for detecting the nearest escape site to safely stop the host vehicle and stopping the host vehicle at the detected escape site, for example.

Note that, in the deceleration traveling, it is expected that the driver becomes more wakeful to perform the driving actively. Also, it may be such that the switching between the manual driving and the automatic driving is performed according to the reliability degree information, and the automatic driving is performed when the degree of reliability is higher than a threshold value.

Also, the event that occurs at a specific time point and the event that occurs in a specific weather condition may be added to the update information in advance, to supply those events to the vehicle that is scheduled to enter the corresponding section. In this case, the entering vehicle executes a correction control for safer traveling, by combining with the maximum performance of the autonomous recognition. Specifically, the safer traveling is realized by reducing the maximum traveling speed to reduce the accident risk due to the recognition delay, by keeping the inter-vehicle distance to the forward traveling vehicle to keep the braking distance, and by increasing the safety distance to keep the distance to the environment such as a walker.

If the above operation is performed by the vehicle control device, the optimal traveling control can be executed, on the basis of the traveling environment information acquired by the host vehicle and the traveling environment information acquired from the local server.

For example, in the traveling route section where the following time traveling environment information is updated within the period of the last several ten minutes or so, the difference between the updated following time traveling environment information and the traveling environment information acquired by the traveling environment acquiring unit is not a traveling risk factor. In this case, when other trouble information does not occur within the period of several ten minutes or so, the automatic driving can be performed at the traveling speed within the legal speed in that traveling route section.

Also, under the traveling environment in which the following time traveling environment information is not updated within the period of the last several ten minutes or so and it is determined that the degree of reliability decreases on the basis of the reliability degree information, the speed is reduced according to the decrease of the degree of reliability, and is reduced to the speed at which the vehicle can be stopped safely, in order to perform the automatic driving.

Also, when the following time traveling environment information is not acquired within the last one to two hours, the difference between the acquired following time traveling environment information and the traveling environment information that is newly acquired on the traveling route is transmitted to the information management center as the manual driving. Thus, the latest information can be supplied in a timely manner from the information management center.

Further, when the autonomous recognition of the traveling environment becomes difficult because of the change of the observable range due to the temporary change of the traveling environment, and the combination of the events that are difficult to predict from the map information only occurs, the difference information from the advance traveling vehicle is extremely important. For example, in the section where the road undulates in the vertical direction, and where the road surface is in a blind angle from the equipped autonomous recognition device such as the imaging unit due to the slope, and where the road further curves in the horizontal direction, and where the road is different from the map information because of construction work or the like, the vehicle is unable to travel the section safely without advance announcement. However, when utilizing the difference information from the advance traveling vehicle, the following vehicle can travel the section safely.

Incidentally, a series of the processes described in the present specification can be executed by hardware, software, or a combination of both. The software can execute the processes by installing a program recording a processing sequence into a memory in a computer integrated with the driving supporting unit 60. For example, the program can previously be recorded in a hard disk drive, SSD (Solid State Drive), or ROM (Read Only Memory) as a recording medium. Or the program can temporarily or permanently be stored (recorded) in a removable medium such as a flexible disk, CD-ROM (Compact Disc Read Only Memory), MO (Magneto optical) disk, DVD (Digital Versatile Disc), BD (Blu-Ray Disc (registered trademark)), magnetic disk, semiconductor memory card. Such a removable recording medium can be provided as so-called packaged software.

Moreover, the program not only be installed in the computer form the removable recording medium but also may be installed by wireless or wired transferring into the computer via a network such as a LAN (Local Area Network) and the Internet from an on-board malfunction diagnosis system (OBD (On Board Diagnosis) system) or download sites. The computer can undergo installation of the received program, which is transferred like that, into the recording medium such as the mounted hard disk drive.

Note that the effects described in the present specification are merely examples, and not limitative; additional effects that are not described may be exhibited. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A system for an autonomous vehicle, the system including:
  a communication interface configured to receive driving environment information corresponding to a driving environment provided by another autonomous vehicle; and
  circuitry configured to determine a navigation route based on a degree of reliability of the driving environment information provided by the another autonomous vehicle.

(2) The system of (1), wherein
  the circuitry is configured to select one of a plurality of navigation routes based on a degree of reliability of the driving environment information.

(3) The system of any of (1) to (2), wherein
  determining the navigation route includes identifying a preferred lane of a plurality of lanes on the navigation route.

(4) The system of any of (1) to (3), wherein
  the degree of reliability of the driving environment information is determined based on information indicating a time at which the driving environment information was acquired.

(5) The system of any of (1) to (4), further including:
  a memory configured to store the driving environment information in association with time information indicating a timing at which the driving environment information was acquired.

(6) The system of (5), wherein
  the circuitry is configured to determine the degree of reliability of the driving environment information based on the time information stored in the memory in associated with the driving environment information.

(7) The system of any of (4) to (6), wherein
  the circuitry is configured to assign a first degree of reliability to a first piece of driving environment information acquired at a first time and a second degree of reliability to a second piece of driving environment information acquired at a second time prior to the first time, the first degree of reliability being greater than the second degree of reliability.

(8) The system of any of (1) to (7), wherein
  the driving environment information provided by the another autonomous vehicle is acquired by one or more sensors at the another autonomous vehicle.

(9) The system of any of (1) to (8), wherein
the driving environment information provided by the another autonomous vehicle is acquired by an image sensor at the another autonomous vehicle.
(10) The system of any of (1) to (9), wherein
the system is an electronic system configured to be implemented by the autonomous vehicle.
(11) The system of (10), wherein
the communication interface is configured to receive the driving environment information from one or more servers.
(12) The system of any of (10) to (11), wherein
the circuitry is configured to control an driving system of the autonomous vehicle based on the navigation route determined based on the degree of reliability of the driving environment information.
(13) The system of (12), wherein
the circuitry is configured to control the driving system in a safe driving mode if the degree of reliability of the driving environment information is lower than a first threshold value.
(14) The system of (13), wherein
controlling the driving system in the safe driving mode includes at least one of reducing a maximum speed of the autonomous vehicle, expediting brake control of the autonomous vehicle or setting a greater inter-vehicle distance for the autonomous vehicle.
(15) The system of any of (13) to (14), wherein
the circuitry is configured to control changing a driving mode of the autonomous vehicle to a manual driving mode if the degree of reliability of the driving environment information is lower than a second threshold value which is lower than the first threshold value.
(16) The system of any of (1) to (9), wherein
the system is one or more servers.
(17) The system of (16), wherein
the communication interface is configured to transmit the determined navigation route to the autonomous vehicle.
(18) A system for implementation in an autonomous vehicle, the system including:
a communication interface configured to receive, from one or more servers, driving environment information corresponding to a driving environment provided by another autonomous vehicle; and
circuitry configured to:
determine a navigation route based on a degree of reliability of the driving environment information received from the one or more servers; and
control a driving system of the autonomous vehicle based on the determined navigation route.
(19) A system for implementation by an autonomous vehicle including:
a communication interface configured to receive driving environment information corresponding to a driving environment provided by another autonomous vehicle; and
circuitry configured to
control the autonomous vehicle to follow a navigation route determined based on a degree of reliability of the driving environment information provided by the another autonomous vehicle;
identify differences between the driving environment information provided by the another autonomous vehicle and characteristics of the driving environment detected by the autonomous vehicle; and
control the communication interface to transmit information indicating the differences between the driving environment information provided by the another autonomous vehicle and the characteristics of the driving environment detected by the autonomous vehicle.
(20) A method implemented by a system configured for use in an autonomous vehicle, the method including:
receiving, by a communication interface of the system, driving environment information corresponding to a driving environment provided by another autonomous vehicle;
controlling, by circuitry of the system, the autonomous vehicle to follow a navigation route determined based on a degree of reliability of the driving environment information provided by the another autonomous vehicle;
identifying, by the circuitry, differences between the driving environment information provided by the another autonomous vehicle and characteristics of the driving environment detected by the autonomous vehicle; and
controlling, by the circuitry, the communication interface to transmit information indicating the differences between the driving environment information provided by the another autonomous vehicle and the characteristics of the driving environment detected by the autonomous vehicle.
(21) A vehicle control device including:
a traveling environment acquiring unit configured to acquire traveling environment information indicating a traveling environment of a host vehicle;
a communication unit configured to acquire, via a communication channel, following time traveling environment information generated on the basis of a change of a traveling environment detected by a vehicle that travels after a specific time relative to a traveling environment indicated by specific time traveling environment information indicating a traveling environment of the specific time;
a traveling environment information processing unit configured to search for a traveling route by using the following time traveling environment information acquired via the communication channel; and
a traveling control processing unit configured to execute a traveling control of the host vehicle in the traveling route searched for by the traveling environment information processing unit, by using the traveling environment information acquired by the traveling environment acquiring unit and the following time traveling environment information acquired via the communication channel.
(22) The vehicle control device according to (1), further including:
a difference information generating unit configured to generate difference information by detecting a change of the traveling environment indicated by the traveling environment information acquired by the traveling environment acquiring unit relative to the traveling environment indicated by the following time traveling environment information acquired via the communication channel,
wherein the communication unit transmits the detected difference information via the communication channel.
(23) The vehicle control device according to (1) or (2), wherein
the traveling control processing unit executes the traveling control according to a degree of reliability of the following time traveling environment information, wherein as an elapsed time from generation of the following time traveling environment information becomes longer, the degree of reliability of the following time traveling environment information decreases.

(24) The vehicle control device according to (3), wherein the traveling control processing unit executes the traveling control by increasing a number of restrictions relevant to traveling as the degree of reliability of the following time traveling environment information decreases.

(25) The vehicle control device according to (3) or (4), wherein
the traveling control processing unit announces, to a driver, a halt or an end of traveling support, when a longer time than a threshold value has passed since the generation of the following time traveling environment information.

(26) The vehicle control device according to any of (3) to (5), wherein
the traveling environment information processing unit executes a change to a different traveling route where traveling support is provided, when a longer time than a threshold value has passed since the generation of the following time traveling environment information, and
the traveling control processing unit performs a traveling control in a driving mode that does not execute the traveling support, when the traveling environment information processing unit is unable to execute the change to the different traveling route where the traveling support is provided.

(27) The vehicle control device according to any of (1) to (6), wherein
the communication unit acquires reliability degree information based on a factor that decreases recognition of the traveling environment, via the communication channel, the traveling environment information processing unit searches for the traveling route by using the reliability degree information, and
the traveling control processing unit executes the traveling control by using the reliability degree information.

(28) The vehicle control device according to (7), wherein
the traveling environment information processing unit searches for a traveling route of a high degree of reliability on the basis of the reliability degree information, and the traveling control processing unit executes the traveling control by increasing a number of restrictions relevant to traveling, as the degree of reliability indicated by the reliability degree information decreases with respect to the traveling route searched for by the traveling environment information processing unit.

(29) The vehicle control device according to any of (1) to (8), wherein
the traveling control processing unit executes a trouble avoidance control and a traveling control according to a result of the avoidance control, when detecting that information of a trouble that is not indicated by the specific time traveling environment information or the following time traveling environment information acquired via the communication unit is included in the traveling environment information acquired by the traveling environment acquiring unit.

(30) The vehicle control device according to (2), wherein
the communication unit transmits information of a trouble, in response to detection of the information of the trouble.

INDUSTRIAL APPLICABILITY

In the vehicle control device, the vehicle control method, the information processing apparatus, and the traffic information supplying system of this technology, the acquisition of the traveling environment information indicating the traveling environment of the host vehicle, as well as the acquisition of the following time traveling environment information generated on the basis of the change of the traveling environment detected by the vehicle that travels after a specific time relative to the traveling environment indicated by the specific time traveling environment information indicating the traveling environment of the specific time via the communication channel, are performed. Also, the traveling route is searched for by using the acquired following time traveling environment information, and the traveling control of the host vehicle in the searched-for traveling route is performed by using the acquired traveling environment information and following time traveling environment information. Thus, the traveling control of the vehicle is performed by using the information of a high degree of reliability relevant to the traveling environment, which is appropriate for the vehicle automatic driving.

REFERENCE SIGNS LIST

10 traffic information supplying system
11 vehicle
12 information management center
20 vehicle control device
30 traveling environment acquiring unit
31 imaging unit
32 sound acquiring unit
33 radar unit
34 position and traffic information acquiring unit
41, 123 communication unit
42 setting and control operation unit
43 manual driving operation unit
44 display unit
45 actuator unit
46 information storage unit
60 driving supporting unit
61 traveling environment information processing unit
62 traveling control processing unit
121 master server
122 local server

The invention claimed is:

1. A control device configured to support operations of an autonomous vehicle, the control device comprising:
a transceiver; and
control circuitry configured to:
wirelessly transmit driving environment information to the autonomous vehicle;
wirelessly receive from one or more other autonomous vehicles driving environment information corresponding to a driving environment detected by the one or more other autonomous vehicles;
determine a degree of reliability of the driving environment information received from the one or more other autonomous vehicles,
wherein the degree of reliability is based on one or more road hazard specific reliability degree factors, each of the one or more road hazard specific reliability degree factors having:
a detection information reliability coefficient,
an erroneous recognition risk coefficient, and
at least one of a straight road coefficient and a curved road coefficient; and
wirelessly transmit to the autonomous vehicle an update to the driving environment information previously provided to the autonomous vehicle, wherein the update to the driving environment information previously provided to the autonomous vehicle comprises an update to one or more predetermined driving measures, and wherein the update is based on:
- a comparison of the previously provided driving environment information to the driving environment information received from the one or more other autonomous vehicles,
- the determined degree of reliability, and
- a road hazard specific notification update frequency associated with a corresponding one of the one or more road hazard specific reliability degree factors.

2. The control device of claim 1, wherein the degree of reliability of the driving environment information is determined based on time information indicating a time at which the corresponding driving environment information was acquired by the one or more other autonomous vehicles.

3. The control device of claim 2, further comprising:
a memory configured to store the received driving environment information in association with the time information indicating a timing at which the driving environment information was acquired by the one or more other autonomous vehicles.

4. The control device of claim 3, wherein the control circuitry is configured to determine the degree of reliability of the received driving environment information based on the time information stored in the memory in association with the driving environment information.

5. The control device of claim 4, wherein the control circuitry is configured to assign a first degree of reliability to a first piece of driving environment information acquired from one of the one or more other autonomous vehicles at a first time and a second degree of reliability to a second piece of driving environment information acquired from another of the one or more other autonomous vehicles at a second time prior to the first time, the first degree of reliability being greater than the second degree of reliability.

6. The control device of claim 1, wherein the driving environment information received from the one or more other autonomous vehicles is acquired by one or more sensors at the one or more other autonomous vehicles.

7. The control device of claim 1, wherein the driving environment information received from the one or more other autonomous vehicles is acquired by an image sensor at the one or more other autonomous vehicles.

8. A system for implementation in an autonomous vehicle, the system comprising:
a transceiver; and
control circuitry configured to:
wirelessly receive, from a control device, driving environment information corresponding to a driving environment detected by one or more other autonomous vehicles;
determine a navigation route based on the driving environment information received from the control device;
control a driving system of the autonomous vehicle based on the determined navigation route and the driving environment information;
wirelessly receive from the control device an update to the received driving environment information, the update based on:
a comparison of the received driving environment information to a subsequent measurement of the driving environment taken by the one or more other autonomous vehicles, and
a degree of reliability of the subsequent measurement taken by the one or more other autonomous vehicles,
wherein the degree of reliability is based on one or more road hazard specific reliability degree factors, each of the one or more road hazard specific reliability degree factors having:
a detection information reliability coefficient,
an erroneous recognition risk coefficient, and
at least one of a straight road coefficient and a curved road coefficient; and
provide an update to the driving system of the autonomous vehicle based on the update to the received driving environment information,
wherein the update to the driving system comprises an update to one or more predetermined driving measures, and
wherein the update to the received driving environment information is based on a road hazard specific notification update frequency associated with a corresponding one of the one or more road hazard specific reliability degree factors.

9. The system of claim 8, wherein the control circuitry is configured to select one of a plurality of alternative navigation routes based on update.

10. The system of claim 8, wherein control circuitry is configured to identify a preferred lane of a plurality of lanes on the navigation route based on the update.

11. The system of claim 8, wherein the control circuitry is configured to control the driving system in a predetermined safe driving mode based on the degree of reliability of the driving environment information being lower than a first threshold value.

12. The system of claim 11, wherein the predetermined safe driving mode includes at least one of reducing a maximum speed of the autonomous vehicle, expediting brake control of the autonomous vehicle or setting a greater inter-vehicle distance for the autonomous vehicle.

13. The system of claim 11, wherein the control circuitry is configured to control changing a driving mode of the autonomous vehicle to a manual driving mode based on the degree of reliability of the driving environment information being lower than a second threshold value which is lower than the first threshold value.

14. A method for a control device configured to support operations of an autonomous vehicle, the method comprising:
wirelessly transmitting driving environment information to the autonomous vehicle;
wirelessly receiving from one or more other autonomous vehicles driving environment information corresponding to a driving environment detected by the one or more other autonomous vehicles; and
determining a degree of reliability of the driving environment information received from the one or more other autonomous vehicles,
wherein the degree of reliability is based on one or more road hazard specific reliability degree factors, each of the one or more road hazard specific reliability degree factors having:
a detection information reliability coefficient,
an erroneous recognition risk coefficient, and
at least one of a straight road coefficient and a curved road coefficient; and
wirelessly transmitting to the autonomous vehicle an update to the driving environment information previously provided to the autonomous vehicle, wherein the update to the driving environment information previously provided to the autonomous vehicle comprises an update to one or more predetermined driving measures, and wherein the update is based on:
- a comparison of the previously provided driving environment information to the driving environment information received from the one or more other autonomous vehicles,
- the determined degree of reliability, and
- a road hazard specific notification update frequency associated with a corresponding one of the one or more road hazard specific reliability degree factors.

15. A control method of an autonomous vehicle, the method comprising:
- wirelessly receiving, from a control device, driving environment information corresponding to a driving environment detected by one or more other autonomous vehicles;
- determining a navigation route based on the driving environment information received from the control device;
- controlling a driving system of the autonomous vehicle based on the determined navigation route and the driving environment information;
- wirelessly receiving from the control device an update to the received driving environment information, the update based on:
  - a comparison of the received driving environment information to a subsequent measurement of the driving environment taken by the one or more other autonomous vehicles, and
  - a degree of reliability of the subsequent measurement taken by the one or more other autonomous vehicles, wherein the degree of reliability is based on one or more road hazard specific reliability degree factors, each of the one or more road hazard specific reliability degree factors having:
- a detection information reliability coefficient,
- an erroneous recognition risk coefficient, and
- at least one of a straight road coefficient and a curved road coefficient; and providing an update to the driving system of the autonomous vehicle based on the update to the received driving environment information, wherein the update to the driving system comprises an update to one or more predetermined driving measures, and wherein the update to the received driving environment information is based on a road hazard specific notification update frequency associated with a corresponding one of the one or more road hazard specific reliability degree factors.

* * * * *